(12) United States Patent
Avetisov

(10) Patent No.: US 11,131,625 B2
(45) Date of Patent: Sep. 28, 2021

(54) HYDROGEN GAS SENSOR AND METHOD FOR MEASUREMENT OF HYDROGEN UNDER AMBIENT AND ELEVATED PRESSURE

(71) Applicant: NEO Monitors AS, Skedsmokorset (NO)

(72) Inventor: Viacheslav Avetisov, Oslo (NO)

(73) Assignee: NEO Monitors AS, Skedsmokorset (NO)

( * ) Notice: Subject to any disclaimer, the term of this patent is extended or adjusted under 35 U.S.C. 154(b) by 0 days.

(21) Appl. No.: 16/772,763

(22) PCT Filed: Dec. 17, 2018

(86) PCT No.: PCT/NO2018/050313
§ 371 (c)(1),
(2) Date: Jun. 12, 2020

(87) PCT Pub. No.: WO2019/117730
PCT Pub. Date: Jun. 20, 2019

(65) Prior Publication Data
US 2020/0309684 A1    Oct. 1, 2020

(30) Foreign Application Priority Data
Dec. 15, 2017   (NO) .................................. 20172001

(51) Int. Cl.
*G01J 5/02* (2006.01)
*G01N 21/3504* (2014.01)
(Continued)

(52) U.S. Cl.
CPC .......... *G01N 21/3504* (2013.01); *G01J 3/433* (2013.01); *G01N 21/39* (2013.01); *G01N 2021/3513* (2013.01)

(58) Field of Classification Search
CPC ............... G01N 21/3504; G01N 21/39; G01N 2021/3513; G01J 3/433; G01J 3/0205
See application file for complete search history.

(56) References Cited

U.S. PATENT DOCUMENTS 5,445,964 A * 8/1995 Lee ......................... G01N 21/39
250/343
5,984,998 A * 11/1999 Ottesen ................. G01N 21/39
75/375
(Continued)

FOREIGN PATENT DOCUMENTS

WO   WO 2012/115149 A1   8/2012

OTHER PUBLICATIONS

Schilt et al., "Wavelength modulation spectroscopy: combined frequency and intensity laser modulation," Applied Optics, vol. 42, No. 33, pp. 6278-6238. (Year: 2003).*

(Continued)

*Primary Examiner* — Kiho Kim
(74) *Attorney, Agent, or Firm* — Hershkovitz & Associates, PLLC; Abe Hershkovitz

(57) ABSTRACT

Gas sensor capable for in-situ non-contact optical measurements of hydrogen gas (H2) and method for measuring hydrogen gas under ambient and elevated pressures without the need for cells with extremely long optical path length. The gas sensor can be configured for dual gas measurements such as H2 and CO2.

11 Claims, 18 Drawing Sheets

(51) Int. Cl.
*G01J 3/433* (2006.01)
*G01N 21/39* (2006.01)

(56) References Cited

U.S. PATENT DOCUMENTS

| | | | | |
|---|---|---|---|---|
| 6,064,488 | A * | 5/2000 | Brand | G01N 21/39 356/437 |
| 7,298,490 | B2 | 11/2007 | Baer et al. | |
| 8,152,900 | B2 * | 4/2012 | Zhou | G01N 21/3504 95/90 |
| 8,467,064 | B2 | 6/2013 | Cholat et al. | |
| 2005/0073687 | A1 | 4/2005 | Chenevier et al. | |
| 2006/0044562 | A1 * | 3/2006 | Hagene | G01N 21/39 356/437 |
| 2007/0076209 | A1 | 4/2007 | Baer et al. | |
| 2012/0133942 | A1 | 5/2012 | Cholat et al. | |
| 2012/0188549 | A1 | 7/2012 | Hoshino et al. | |
| 2015/0099274 | A1 * | 4/2015 | Axelrod | C12Q 1/04 435/39 |
| 2015/0276588 | A1 * | 10/2015 | Marshall | G01N 21/05 250/343 |
| 2018/0275048 | A1 * | 9/2018 | Das | G01N 21/3504 |

OTHER PUBLICATIONS

Buttner et al., "An overview of hydrogen safety sensors and requirements", International Journal of Hydrogen Energy, vol. 36, Issue 3, Feb. 2011, pp. 2462-2470.

Bjorklund et al., "Theory of lineshapes and signal-to-noise analysis", Applied Physics B, 1983, vol. 32, p. 145.
Ap2e; "ProCeas H2 Trace analyzer", Mar. 17, 2017, retrieved from URL: http://www.ap2e.com/wp-content/uploads/ProCeas-H2trace-analyzer.pdf.
Reid et al., "Second-harmonic detection with tunable diode lasers— Comparison of experiment and theory.", Applied Physics B, Nov. 1981, vol. 26, Issue 3, pp. 203-210.
Wcislo et al., "The implementation of non-Voigt line profiles in the HITRAN database: H2 case study", Journal of Quantitative Spectroscopy and Radiative Transfer, Jul. 2016, vol. 177, pp. 75-91.
Campargue et al., "The absorption spectrum of H2: CRDS measurements of the (2-0) band, review of the literature data and accurate ab initio line list up to 35000 cm-1", Physical Chemistry Chemical Physics, 2012, vol. 14, pp. 802-815.
Wolniewicz et al., "Quadrupole Transition Probabilities for the Excited Rovibrational States of H2", Astrophysical Journal Supplement Series, 1998, vol. 115, pp. 293-313.
Kassi et al., "Electric quadrupole transitions and collision induced absorption in the region of the first overtone band of H2 near 1.25 µm", Journal of Molecular Spectroscopy, 2014, vol. 300, pp. 55-59.
Ngo et al., "An isolated line-shape model to go beyond the Voigt profile in spectroscopic databases and radiative transfer codes", Journal of Quantitative Spectroscopy and Radiative Transfer, 2013, vol. 129, pp. 89-100.
Linnerud et al., "Gas monitoring in the process industry using diode laser spectroscopy", Appl. Phys. B, 1998, vol. 67, pp. 297-305.
International Search Report in International Application No. PCT/NO2018/050313, dated Jul. 3, 2019.
International Preliminary Report on Patentability in International Application No. PCT/NO2018/050313, dated Apr. 30, 2020.

* cited by examiner

HYDROGEN GAS SENSOR AND METHOD FOR MEASUREMENT OF HYDROGEN UNDER AMBIENT AND ELEVATED PRESSURE

BACKGROUND OF THE INVENTION

Field of the Invention

The invention relates to measurement of hydrogen gas (H2) for use in process analysis, safety applications etc. The invention will have applications within chemical and petrochemical industries or in other areas where hydrogen gas can be present.

Background Art

The measurement of hydrogen gas can be of interest in many chemical processes and gas mixtures. Climate change and focus on reducing the use of fossil fuels have led to great interest in hydrogen as an energy carrier for instance in fuel cells. Hydrogen is very explosive when it comes in contact with oxygen. Any leaks into the atmosphere around production facilities cause potential hazards.

The demand for hydrogen gas sensors is very high and it is increasing. Today all hydrogen sensors/detectors are point sensors or extractive analyzers. Sensors/analyzers for non-contact in-situ measurements of H2 are not available. This is especially important for industrial applications where hydrogen must be monitored in reactive, toxic and corrosive gas streams.

Open path sensors based on absorption spectroscopy are not available. All hydrogen analyzers based on absorption spectroscopy that are available today are of extractive type and use cavity-enhanced absorption techniques. The extractive cells incorporate highly reflective mirrors to create high-finesse cavities. When laser light is injected into such a cavity it bounces many times between the mirrors before it leaks out onto a detector. In this way extremely long optical paths, up to several kilometres, are realised to achieve the sensitivity required to measure weak hydrogen absorption. To reduce the effect of potential interfering gases the pressure inside the extractive cells is often reduced significantly below the atmospheric pressure. All these mentioned analyzers are based on taking a gas sample into a cell and consequently these cannot be in-situ analyzers.

PRIOR ART

Buttner et. al discuss the topic of hydrogen sensors in the academic paper «An overview of hydrogen safety sensors and requirements» [International Journal of Hydrogen Energy, Volume 36, Issue 3, February 2011, Pages 2462-2470]. The findings of Buttner et al are that all available sensors are point sensors either sampling or measuring only in a single point. The following technologies have been listed by Buttner et. al.:

Electrochemical sensors (EC)

Metal Oxide Sensors (MOX)

"Pellistor"-type combustible gas sensors (CGS)

Thermal conductivity sensors (TC)

Optical Devices (Opt)

Pd-film and Pd-alloy films (Pd)

In the section "Optical Devices" Buttner et. al. state the following:

"Sensors for the direct optical detection of hydrogen are not readily available because hydrogen is non-adsorbing in the ultraviolet-visible or IR."

The authors apparently conclude that it is impossible to measure hydrogen gas by absorption spectroscopy.

Then Buttner et. al. continue:

"However, very sensitive sensor platforms have been developed which undergo changes in optical properties upon exposure to hydrogen. Many devices are based on optical properties of palladium films [e.g. 14-16]. Other devices are based on chemical mediators that undergo colour changes upon exposure to hydrogen."

Buttner et. al. have a view on the technology that traditional absorption spectroscopy is impossible, but there are some techniques that can utilise the change in optical properties of materials as function of exposure to hydrogen. Optical and other techniques reviewed by Buttner et. al. support only point detection of hydrogen.

Raman spectroscopy can be applied to measure hydrogen. The technique is based on inelastic scattering of laser light on molecules, and it is, therefore not absorption spectroscopy. The scatted light is detected at a shifted frequency. Raman lidar was used to detect hydrogen in open air. Among the disadvantages of this technique are poor sensitivity and the need for high power lasers. The use of high power lasers in industrial areas is generally prohibited due to safety reasons.

U.S. Pat. No. 7,298,490 B2 to Los Gatos Research, Baer et al, with title "HYDROGEN SENSOR BASED UPON QUADRUPOLE ABSORPTION SPECTROSCOPY" describes techniques used to measure hydrogen absorption in a cell. To achieve detectability of hydrogen the cavity enhanced technique is used. The technique referred to as ICOS or off-axis ICOS (Intra Cavity Output Spectroscopy). The reflectivity of the mirrors in the cell must be very high and no contamination can take place. For use in industrial environments it could be difficult to keep the sampled gas so clean that no material will deposit on the mirror surfaces. This requires an extractive sampling technique that purifies the gas sample before it enters the ICOS cell.

U.S. Pat. No. 7,298,490, Baer et al, further states (column 2, lines 22-28): "Since the hydrogen linewidths are broadened due to the Doppler broadening of this light molecule, other sensitive techniques such as frequency modulation (cf., G. C. Bjorklund, M. D. Levenson, W. Lenth, and C. Oritz, "Theory of lineshapes and signal-to-noise analysis", Appl. Phys. B, vol. 32, page 145 (1983)) are not viable solutions to the problem." The authors conclude that any frequency modulation techniques, to which WMS (Wavelength Modulation Spectroscopy) belongs, are not applicable to measure hydrogen, and in-situ TLAS WMS apparently cannot be possible.

The invention described in U.S. Pat. No. 7,298,490, Baer at al, is based on sampling of a process point and leading the sampled gas to an ICOS cell where the measurement takes place. This invention cannot be used for in-situ measurement.

Another analyzer for H2 measurement is described in datasheet for the "ProCeas H2 Trace analyzer" from ap2e present at their website Mar. 17, 2017 16:30 (GMT+1) at the following link:

http://www.ap2e.com/wp-content/uploads/ProCeas-H2trace-analyzer.pdf

This analyzer is based on the cavity-enhanced absorption technique as well and, thus, cannot be used for in-situ measurements. The cavity enhanced technique is referred to as OF-CEAS (Optical Feedback Cavity Enhanced Absorption Spectroscopy). The sampling method used in the system is described in U.S. Pat. No. 8,467,064, Lonigro et al. When CO2 or other gases that have absorption lines close to the hydrogen line are present in the gas sample, the pressure of the sampling system and the cavity cell is reduced significantly below ambient pressure to avoid interference. The requirement for pressure reduction complicates the system.

A publication describing wavelength modulation spectroscopy, WMS, is Reid et al: "Second-harmonic detection with tunable diode lasers—Comparison of experiment and theory." J. Reid, D. Labrie. Applied Physics B, November 1981, Volume 26, Issue 3, pp 203-210.

Several academic publications discuss properties of the hydrogen absorption lines. Some of these publications are:
Wcislo et al: "The implementation of non-Voigt line profiles in the HITRAN database: H2 case study"
Wcislo, P.; Gordon, I. E.; Tran, H.; Tan, Y.; Hu, S.-M.; Campargue, A.; Kassi, S.; Romanini, D.; Hill, C.; Kochanov, R. V.; Rothman, L. S.
Journal of Quantitative Spectroscopy and Radiative Transfer, Volume 177 (2016), p. 75-91.
Campargue et al: "The absorption spectrum of H2: CRDS measurements of the (2-0) band, review of the literature data and accurate ab initio line list up to 35000 cm-1."
Campargue A, Kassi S, Pachucki K, Komasa J.
Physical Chemistry Chemical Physics 2012; 14:802-15.
Wolniewicz et al: "Quadrupole transition probabilities for the excited rovibrational states of H2."
Wolniewicz L, Simbotin I, Dalgarno A.
Astrophysical Journal Supplement Series 1998; 115:293-313.
Kassi et al: "Electric quadrupole transitions and collision induced absorption in the region of the first overtone band of H2 near 1.25 μm",
Kassi S, Campargue A.
Journal of Molecular Spectroscopy 2014; 300:55-9.

Alternatives to the Voigt profile line shape are discussed in academic publication:
Ngo et al: An isolated line-shape model to go beyond the Voigt profile in spectroscopic databases and radiative transfer codes.
Ngo N. H., Lisak D., Tran H., Hartmann J.-M.
Journal of Quantitative Spectroscopy and Radiative Transfer 2013; 129:89-100.

The HITRAN 2016 database lists parameters describing profiles of absorption lines for a number of gases.

US patent application publication US 2006/0044562 A1, "Gas Monitor", describes concepts for gas monitors and in particular gas monitors based on direct absorption spectroscopy.

Academic publication "Gas monitoring in the process industry using diode laser spectroscopy", Linnerud et al, Appl. Phys. B 67, 297-305 (1998) describes several aspects of gas monitoring based on second harmonic laser spectroscopy.

The following table lists abbreviations used in this patent application:

| Abbreviation | Descriptions |
| --- | --- |
| % v | percent volume, gas concentration in percent of volume |
| AD-converter | Analogue to Digital converter |
| AR | Anti-Reflective (coating, optics) |
| CRDS | Cavity Ring-Down Spectroscopy |
| DAS | Direct Absorption Spectroscopy |
| dWMS | Digital Wavelength Modulation Spectroscopy |

-continued

| Abbreviation | Descriptions |
| --- | --- |
| HITRAN | HIgh-resolution TRANsmission molecular absorption database |
| HWHM | Half Width at Half Maximum of an absorption line |
| ICOS | Intra Cavity Output Spectroscopy |
| LOD | Limit Of Detection |
| LEL | Lower Explosion Limit |
| MVA | MultiVariate Analysis |
| OF-CEAS | Optical Feedback Cavity-Enhanced Absorption Spectroscopy |
| SG | Savitzky-Golay, digital filter type |
| SNR | Signal to Noise Ratio |
| TLAS | Tunable Laser Absorption Spectroscopy |
| WMS | Wavelength Modulation Spectroscopy |

SUMMARY OF THE INVENTION

Problems to be Solved by the Invention

A main objective with the current invention is to make an optical absorption based hydrogen sensor/analyzer that can operate at around ambient and at elevated pressures as well as directly in-situ for non-contact optical H2 measurements. Cell designs like in ICOS, OF-CEAS or CRDS (Cavity Ring Down Spectroscopy) should be avoided and the same applies to cells with pressure reduced below atmospheric pressure. An extractive version of the analyzer according to the current invention should therefore use a cell with simple optical configuration that is not of cavity enhanced type and the cell should operate at ambient or at elevated pressure.

Details of Problems to be Solved in the Current Invention

Measurements according to the current invention can be in-situ, extractive on a single pass cell, extractive on a double or multi-pass cell as well as open path through atmosphere. Measurements are based on Tunable Laser Absorption Spectroscopy (TLAS).

Previously, in prior art, H2 was measured using cavity enhanced absorption spectroscopy: ICOS (Baer et al), CRDS (Campargue et al and Kassi et al), OF-CEAS (Lonigro et al).

Since lower explosion limit (LEL) for hydrogen gas is about 4% v, most H2 detectors/sensors offer the measurement range of 0-10% v. Thus, limit of detection (LOD) of a typical sensor used for safety applications should be less than 0.5% v (5% relative of the range), preferably it should be 0.2% v. It is commonly accepted that the H2 lines are too weak to achieve this LOD without using cavity enhanced techniques. According to the current invention, an in-situ or an open path TLAS analyzer or an extractive single-path-cell TLAS analyzer should achieve this LOD on 1 meter optical pathlength (LOD=0.2% v*meter) only. If better sensitivity than 0.2% v is needed for certain applications, the TLAS analyzer, instead of a single pass cell, could incorporate a small multipass cell (e.g. of White or Herriott type) with a moderate pathlength from 1 to 30 meters. For comparison, the effective pathlength in cavity enhanced cells can be several hundreds of meters and even several kilometres.

The strongest H2 line is (1-0) S(1) at about 2121.8 nm (4712.9 cm-1). The line strength is $3.2*10^{-26}$ cm/molecule (Campargue et al, Wolnewicz et al and HITRAN 2016). The peak absorbance calculated by using the HITRAN parameters and Voigt profile gives $1.0*10^{-6}$ of relative absorption for 0.2% v*meter of H2 in air. Such absorbance is not feasible to detect in-situ. In addition, this line suffers from CO2 interference. Except CO2 there are other gases, e.g. hydrocarbons, that create interference to the H2 line. The CO2 line is very close to the H2 line (about 0.13 cm-1 away). In presence of CO2 absorption the H2 line cannot be resolved from the CO2 line profile. This is illustrated in FIG. 6 which shows the default HITRAN modelling (simulation) of the absorption spectrum of hydrogen (5110), 1% v concentration, and CO2 (5210), 10% v concentration, for 1 meter pathlength and for ambient temperature and pressure. The simulation spectra shown in FIG. 6 indicate that it is impossible to detect lower than 1% v of H2 in presence of significant amount of CO2 such as 10% v, which is rather typical CO2 concentration in many industrial processes, e.g. flue gas from combustion.

The existing "ProCeas H2 Trace Analyzer" from company "ap2e" is a cavity enhanced H2 analyzer and uses a vacuum pump to get lower pressure inside the cavity.

Recently, several authors investigated H2 absorption spectrum using cavity enhanced techniques. It was shown that the profiles of hydrogen absorption lines cannot be described by the Voigt profile due to strong collisional (Dicke) narrowing effect (Campargue et al, Ngo et al and Kassi et al).

The self-broadening coefficient for (1-0) S(1) line was measured to be 0.0019 cm-1/atm. (Wcislo et al), more than ten times smaller than the Doppler HWHM of 0.021 cm-1. Without collisional narrowing, the H2 line profile at ambient pressure would be predominantly Gaussian with HWHM almost equal to the Doppler HWHM. The collision frequency factor describing the narrowing effect was measured to be 0.045 cm-1/atm. (Wcislo et al). As a result, the self-broadened H2 line at ambient pressure is even narrower than at very low pressures where Doppler broadening dominates. This is illustrated in FIG. 13, where HWHM of the H2 line (5170) is plotted as a function of pressure. HWHM at 1 atm (ambient pressure) is smaller than at 0 atm (vacuum). Measurements performed by the author confirm the results obtained by Wcislo et al. for self-broadening. The line parameters for nitrogen and air broadening and narrowing have not been published yet. The author has found that HWHM of the H2 line broadened by nitrogen and/or air behaves similarly, as for self-broadening, with HWHM at 1 atm of about 0.012 cm-1, which is significantly smaller than the Doppler HWHM.

Although the format of the HITRAN database has been changed to include parameters for more complicated line profiles that incorporate collisional narrowing (Wcislo et al), the current HITRAN16 version (at the time of the patent submission) still shows only default 0.05 cm-1/atm air and self-broadening coefficient for all H2 lines.

FIG. 7 illustrates the H2 profile at 1 atm air pressure like what it would be without (5190) collisional narrowing compared to the actual profile (5192) with collisional narrowing. Both profiles (5190, 5192) have the same integral. The H2 effective HWHM in Air balance at pressure of 1 atm. The peak amplitude is estimated to be about 35-40% larger than expected by assuming the Voigt profile.

As a result of the performed modelling and measurements, the author estimates the peak absorbance for 0.2% v*meter of H2 in Nitrogen and Air to be about 4*10-6 to 5*10-6 of relative absorption. This is still very weak absorption which normally not detectable in-situ by an absorption measurement technique. Nevertheless, the current invention describes the method and apparatus to achieve this sensitivity to be able to detect at least 0.2% v H2 with 1 meter pathlength. In addition, the current invention solves the problem of CO2 interference and possibly interference from other gases.

HWHM of the CO2 line is about 0.07 cm-1 and the line is 0.13 cm-1 away from the H2 line. So, the H2 line appears to be in the background of the CO2 absorption as illustrated in FIG. 6. The detection of an absorbance weaker than 10-5 on the background of much stronger CO2 absorption line is extremely difficult. Moreover, in an industrial process, the CO2 line varies in amplitude and width, making it impossible to use subtraction of a previously recorded CO2 reference absorption.

Existing methods using either direct absorption spectroscopy (DAS) or wavelength modulation spectroscopy (WMS) cannot be used for H2 detection with the required sensitivity.

1) Conventional DAS using the method of profile fitting to total signal for both CO2 and H2 simultaneously. The method is prone to baseline and offset errors and thus is not useful due to very weak absorption of H2 compared to CO2. In addition, since Voigt profile cannot be used for H2, a more complex profile must be used which complicates the method implementation and consumes significant microprocessor resources. In general, the method is not applicable to measure very weak absorption signals.
2) DAS or WMS using the method of multivariate analysis (MVA). The method works best when the absorptions of different components are of the same order of magnitude. The signal-to-noise ratio must also be good enough for MVA to work. Detection of a weak absorption line (H2) in the background of a strong and varying interfering line (CO2) is not feasible.
3) DAS or WMS using classical least-square. The method is not practical for in-situ measurements of process gas with varying pressure, temperature and gas composition. The signal-to-noise ratio must be good enough for this to work. The method is therefore not suitable for detection of H2 in presence of CO2.
4) Conventional WMS using peak detection. Although is capable to detect an absorbance weaker than 10-5, the method suffers from interference from nearby absorption lines of other gas components. It is not possible to discriminate between H2 and CO2 absorption lines.

Means for Solving the Problems

The objectives are achieved according to the invention by a gas analyzer as defined in the preamble of independent claim 1, having the features of the characterising portion of claim 1.

A number of non-exhaustive embodiments, variants or alternatives of the invention are defined by the dependent claims.

SUMMARY OF THE INVENTION

The gas analyzer according to the current invention is capable of measuring hydrogen, H2, gas under conditions where no other prior art gas sensors/analyzers can work. It can function at relatively short optical path lengths that typically are present in normal process application in the industry. In addition, it can operate under normal atmospheric pressure and even at somewhat elevated pressures. There is no need for special cells giving ultra-long optical paths or for cells where the pressure can be significantly reduced under normal atmospheric pressures. There is no need for a vacuum pump or other means to reduce a cell gas pressure.

The gas analyzer according to the current invention operates around the H2 line at 2121.8 nm. The information on this absorption line in the HITRAN database is in the best case incomplete indicating wider linewidth and weaker line amplitude (as a consequence of wide linewidth) than in the real life. Academic publications have found that the self-broadening parameter for this line is much smaller than the default value by HITRAN. The author has found that the air and nitrogen broadening parameters are as well much smaller than the default value by HITRAN and that the collisional narrowing in air and nitrogen is strong such as the line is significantly narrower and, thus, has significantly larger amplitude that could be expected assuming the Doppler dominated line profile.

The main problem to be solved of the current invention is to be able to measure on the H2 2121.8 nm line with high sensitivity in presence of the strong and relatively wide CO2 line close by.

A first aspect of the current invention is a gas analyzer based on tuneable laser spectroscopy for measurement of concentration of at least one gas component in a target gas (500) comprising a gas matrix possibly comprising an interfering gas, the analyzer comprising a transmitter part (600) and a receiver part, the transmitter part comprising a tunable laser arranged for emitting laser light in the form of a laser beam, the laser beam following an optical path, wavelength of the laser light being tuned and modulated across an absorption line of the at least one gas component to be measured, the laser beam passing through the target gas and onto a light sensitive detector comprised by the receiver part, the light sensitive detector generating an absorption signal possibly comprising an absorption signal contribution from the gas component to be measured and from the interfering gas, a digitization unit digitizing the absorption signal, the digitized absorption signal from the digitization unit being inputted to a processing unit, and the processing unit performing calculation of the measured concentration of gas component to be measured in the target gas based on the digitized absorption signal. The gas analyser is adapted to measuring the concentration of Hydrogen gas, H2, under ambient pressure or at elevated pressure, the wavelength of the laser light being tuned across an H2 absorption line near 2122 nm, and where amplitude of the modulation of the laser is set to enhance the H2 absorption line near 2122 nm and to suppress absorption lines from possible interfering gases, applying a digital filter of a higher order digital filter type adapted to enhance the H2 absorption line and to supress contribution of the possible interfering gases in the signal, and calculating the concentration of hydrogen gas component in the processing unit based on the filtered signal.

Optionally, the gas analyzer is using WMS or dWMS measuring the H2 concentration and a concentration of another gas intermittently, where both the wavelength modulation amplitude and the application of the at least one digital filter of at least a $2^{nd}$ derivative order are intermittently adapted for measurement of either the H2 concentration or the concentration of the other gas. The other gas can be CO2.

Optionally, the gas analyzer is using an extractive setup with a cell containing the target gas, and where the target gas is contained in or is flowing through the cell. The cell can be one of the types: single pass cell, dual pass cell, and multi-pass cell.

Optionally, the pressure of the target gas is elevated to measure H2 and to supress signals from other gases. Optionally, the cell pressure intermittently varies depending on the gas to be measured.

Optionally, the pressure is ambient or elevated between ambient and 5 bars abs for measurement of H2 and where the pressure is adjusted to about ambient pressure for measurement of another gas.

Optionally, the gas analyzer is configured for wavelength modulation spectroscopy, WMS, having a higher frequency WMS modulation on top of the ramp scan, the analogue processing unit comprising an analogue mixing functionality generating a harmonic signal. Optionally, the amplitude of the WMS modulation is set to enhance the H2 absorption line and supress absorption lines from other possibly interfering gases. Optionally, the WMS modulation amplitude is approximately 2.2 times the half width half max, HWHM, of the H2 absorption line in the target gas.

Optionally, the digital filter is a higher order digital filter type adapted to enhance the H2 absorption line and to supress the contribution of the interfering gases like CO2.

Optionally, a second digital filter functional step is a custom digital filter function.

Optionally, the digital filter functional steps in sum are of at least in effect a 4th derivative Savitzky-Golay filter type and in sum of at least 4th order in effect.

Optionally, the gas analyzer is configured for digital wavelength modulation spectroscopy, dWMS, having a higher frequency modulation on top of the ramp scan (1000), the digitization unit comprising a digital demodulation functionality generating a digital signal equivalent to a harmonic signal.

Optionally, the digitization unit is digitizing with more than 20 bits resolution and sampling with at least one sample per five pm (picometer), preferably one sample per one pm or more during a wavelength scan.

Optionally, the WMS modulation amplitude is set to enhance the H2 absorption line and supress absorption lines from other possibly interfering gases. Optionally, the modulation amplitude is approximately 2.2 times the half width half max, HWHM, of the absorption H2 line, in the target gas.

Optionally, the digital filter is any one of a higher order digital filter type adapted to enhance the H2 absorption line and to supress the contribution of other gases like CO2. Optionally, a second digital filter functional step is based on any custom digital filter function Optionally, the sum of digital filter functional steps are of at least 4th derivative in effect using Savitzky-Golay filter type in effect of at least 4th order.

Optionally, the gas analyzer is arranged to turning off the higher frequency wavelength modulation, using direct absorption spectroscopy, where the absorption signal is sampled with a high resolution with regards to spectral resolution and amplitude resolution.

Optionally, the high amplitude resolution is secured by the digitization unit with more than 20 bits resolution and where the spectral resolution is secured by sampling with at least one sample per five pm (picometer), preferably one sample per one pm or more during a ramp scan.

Optionally, the absorption signal is filtered with at least one digital filter functional step enhancing the H2 absorption line and supressing the lines of other interfering gases like CO2.

Optionally, the at least one digital filter functional step is based on at least a $6^{th}$ derivative Savitzky-Golay filter of at least 6th order. Optionally, a first digital filter functional step is based on a second order smoothing Savitzky-Golay filter and a second optional digital filter functional step is based on a $2^{nd}$ or $4^{th}$ derivative Savitzky-Golay filter and a third optional digital filter functional step is based on any other custom envelope function.

Optionally, the at least one digital filter functional step is comprising at least two individual digital filter functional sub-steps.

Optionally, the gas analyzer is comprising a reference gas cell containing another gas than H2 with at least one absorption line close to the absorption line for H2 so that the H2 absorption line and the at least one absorption line of the other gas than H2 can be scanned with the same laser, using the at least one absorption line of the other gas than H2 in the cell to verify that the laser is scanned so that the laser wavelength is operated in a wavelength interval comprising the absorption line of H2.

Optionally, the reference gas cell containing the other gas, the other gas being N2O. Optionally, the reference gas cell is permanently arranged in the optical path. Optionally, the reference gas cell is arranged for being flipped in and out of the optical path depending on required function.

Optionally, information from measurement with the reference gas cell in the optical path is used in a feedback loop to adjust tuning range of the laser so that the centre of the absorption line of H2 in the absorption signal is positioned at the same position relatively to the laser tuning range.

Optionally, information from measurement with the reference gas cell inserted is used to measure laser tuning range and to verify that the laser tuning range is as required to cover a selected tuning range, the selected tuning range comprising wavelengths of selected absorption lines.

Optionally, information from measurement with inserted reference gas cell (550) is used in a feedback loop to adjust the laser tuning range so that the laser is tuned so that the position of absorption lines is kept approximately in the same position relatively to the sampled region and so that the laser tuning is kept linear or in another predefined way of tuning.

Another aspect of the invention is a method based on tuneable laser spectroscopy for measurement of concentration of at least one gas component in a target gas comprising a gas matrix possibly comprising an interfering gas, the method using an analyser comprising a transmitter part and a receiver part, the receiver part comprising a light sensitive detector, and the transmitter part comprising a tunable laser. The method comprises the following steps:
  emitting laser light in the form of a laser beam by the transmitter part, the laser beam following an optical path,
  tuning and modulating wavelength of the laser light across an absorption line of the at least one gas component,
  passing the laser beam through the target gas and onto a light sensitive detector,
  generating an absorption signal possibly comprising an absorption signal contribution from the gas component to be measured and from the interfering gas, by the light sensitive detector,
  digitizing the absorption signal, by a digitization unit, providing a digitized absorption signal,
  inputting the digitized absorption signal from the digitization unit to a processing unit, and
  calculating the measured concentration of gas component based on the digitized absorption signal by the processing unit.

The method further comprises the following steps:
  being applied under ambient or at elevated pressure, and the at least one gas component being Hydrogen gas, H2,
  the tuning of the wavelength of the laser light being performed across an H2 absorption line near 2122 nm,
  setting the amplitude of the modulation of the laser to enhance the H2 absorption line near 2122 nm and to suppress absorption lines from other possibly interfering gases,
  filtering by the processing unit, the digitized absorption signal by a digital filter of a higher order adapted to enhance the H2 absorption line and to supress contribution of the possibly interfering gases in the signal, providing a filtered signal, and
  calculating the concentration of hydrogen gas component based on the filtered signal.

BRIEF DESCRIPTION OF THE DRAWINGS

The above and further features of the invention are set forth with particularity in the appended claims and together with advantages thereof will become clearer from consideration of the following detailed description of an exemplary embodiment of the invention given with reference to the accompanying drawings.

The invention will be further described below in connection with exemplary embodiments which are schematically shown in the drawings, wherein:

FIG. 2 is not to scale.

FIG. 4 is not to scale.

FIG. 5 is not to scale and is made to illustrate techniques.

DESCRIPTION OF REFERENCE SIGNS

Figure 1:
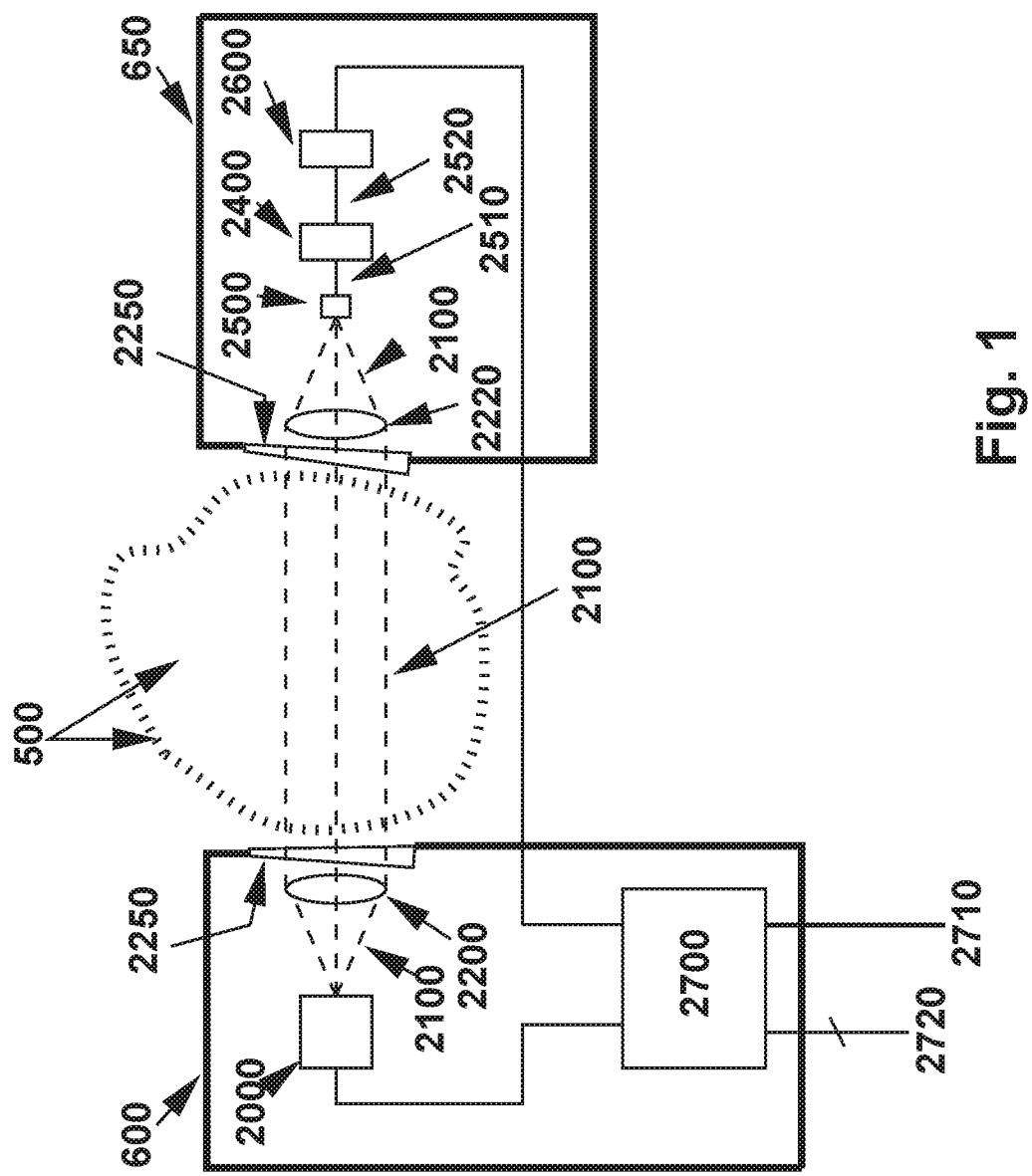
FIG. 1 shows a simplified and schematic view of an H2 gas analyzer according to the current invention. The Figure serves as an example to explain the basic concept of the gas analyzer.

| Number | Description |
|---|---|
| 500 | The target gas that could contain varying concentrations of H2 as well as other gases |
| 550 | Cell containing a gas for verification purposes, line tracking etc. |
| 600 | Analyzer part, the transmitter unit |
| 650 | Analyzer part, the receiver unit |
| 1000 | Laser current ramp scan to scan laser wavelength across absorption lines |
| 1050 | Higher frequency sine wave modulation on top of ramp used for scanning laser, used in WMS |
| 1100 | Time slot where the laser current is off |
| 1150 | Time slot where the laser will stabilise after laser-current-off time slot |
| 2000 | The laser, typically also comprising a thermo-electric cooler, TEC |
| 2100 | Laser beam |
| 2200 | Beam shaping optics, lens that shapes the laser beam from the laser |
| 2220 | Focusing lens that focus light onto the detector |
| 2250 | Wedged window isolating analyzer parts from the ambient or the process |
| 2400 | Analogue electronics or analogue processing unit, amplifier unit, in WMS case also analogue mixing |
| 2500 | Light sensitive detector |
| 2510 | Analogue signal from detector |
| 2520 | Conditioned or processed analogue signal, in WMS case harmonic signal |
| 2600 | Digitization unit, doing sampling and A/D conversion |
| 2700 | Processing unit processing sampled and digitized data, calculating measurement values, doing analyzer house keeping |
| 2710 | Input power to gas analyzer |
| 2720 | Input/output interface comprising input and output signals |
| 5110 | Transmission spectrum for hydrogen, H2 |
| 5120 | Modelled absorption signal for H2, 1% v*m, normalized and inverted |
| 5130 | Filtered direct absorption signal for H2 |
| 5135 | Level corresponding to 0.2% v*m H2 for filtered direct absorption signal |
| 5140 | Plot for H2, normalized WMS peak signal versus ratio of modulation amplitude to H2 HWHM. |
| 5145 | Max peak level position on 5140 |
| 5150 | Modelled 2f WMS signal for H2, 1% v*m |
| 5160 | Filtered 2f WMS signal for H2 |
| 5165 | Level corresponding to 0.2% v*m H2 for filtered WMS |
| 5170 | HWHM for H2 as a function of pressure in atm |
| 5180 | H2 peaks for 1.0 and 1.5 atm pressure, before filtering, WMS case |
| 5185 | H2 peaks for 1.0 and 1.5 atm pressure, after filtering, WMS case |
| 5190 | Calculated H2 line profile, collisional narrowing not included |
| 5192 | Calculated H2 line profile, collisional narrowing included. The line profile integral is the same as for 5190. |
| 5210 | Transmission spectrum for CO2 |
| 5220 | Modelled absorption signal for CO2, 10% v*m, normalized and inverted |
| 5230 | Filtered direct absorption signal for CO2 |

-continued

| Number | Description |
|---|---|
| 5240 | Plot for CO2, normalized WMS peak signal versus ratio of modulation amplitude to H2 HWHM. |
| 5250 | Modelled 2f WMS signals for CO2, 10% v*m |
| 5260 | Filtered WMS signal for CO2 |
| 5270 | HWHM for CO2 as a function of pressure in atm |
| 5280 | CO2 peak 1.0 atm pressure, before filtering, WMS case |
| 5282 | CO2 peak 1.5 atm pressure, before filtering, WMS case |
| 5285 | CO2 peak 1.0 atm pressure, after filtering, WMS case |
| 5287 | CO2 peak 1.5 atm pressure, after filtering, WMS case |
| 5310 | Transmission spectrum for CO2 and H2 |
| 5410 | Absorption signal curve 1.0 atm pressure, before filtering, WMS |
| 5411 | Absorption signal curve 1.0 atm pressure, after filtering, WMS |
| 5415 | Absorption signal curve 1.5 atm pressure, before filtering, WMS |
| 5416 | Absorption signal curve 1.5 atm pressure, after filtering, WMS |
| 5420 | Absorption signal curve of 1% v H2 and 10% v CO2 on 1 meter pathlength, WMS before filtering, optimized for H2 measurements |
| 5430 | Absorption signal curve of 1% v H2 and 10% v CO2 on 1 meter pathlength, WMS after filtering, optimized for H2 measurements |
| 5440 | Absorption signal curve of 1% v H2 and 10% v CO2 on 1 meter pathlength, WMS before filtering, optimized for CO2 measurements |
| 5450 | Absorption signal curve of 1% v H2 and 10% v CO2 on 1 meter pathlength, WMS after filtering, optimized for CO2 measurements |
| 5520 | N2O peaks from 2 mm cell, 10% N2O, WMS, before filtering |
| 5530 | N2O peaks from 2 mm cell, 10% N2O, WMS, after filtering |
| 5390 | Absorption signal curve of 1% v H2 and 10% v CO2 on 1 meter pathlength, filtered WMS |
| 5395 | Absorption signal curve of 10% v CO2 on 1 meter pathlength, filtered WMS |
| 5196 | Level corresponding to zero H2, filtered WMS |
| 5195 | Level corresponding to 0.2% v*m H2, filtered WMS |
| 5540 | N2O peaks from 2 mm cell, 0.25% N2O, 0.35 atm, filtered WMS |
| 5197 | H2 peak 1% v H2, 1 meter path length |
| 5290 | CO2 peak 10% CO2, 1 meter path length |

DETAILED DESCRIPTION OF INVENTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The invention will be further described in connection with exemplary embodiments which are schematically shown in the drawings.

FIG. 1 shows a simplified and schematic view of an H2 gas analyzer according to the current invention. A transmitter unit (600) comprises a tunable laser (2000). The laser (2000) emits a laser beam (2100) and a beam shaping optics 2200 forms the laser beam (2100) before it is transmitted through an optical window (2250). The laser beam (2100) passes through a target gas (500). The target gas (500) can comprise varying concentration of hydrogen, H2, as well as other gases that could be present in the atmosphere or in a process. A receiver (650) comprises a detector system that receives the laser beam (2100) through a window (2250). The laser beam (2100) is focused by a focusing lens (2220) onto a light sensitive detector (2500). The light sensitive detector (2500) is converting a light signal into an analogue electrical signal (2510). The analogue electrical signal (2510) is received by an analogue electronics unit (2400). The analogue electronics unit (2400) will amplify and condition the analogue signal (2510) from the detector in the DAS and dWMS cases and in addition do analogue signal processing in the analogue WMS case. The analogue signal processing in the WMS case will include harmonic detection using analogue mixers or alternatively lock-in amplifiers. A processed electronic signal (2520) which might have been amplified, conditioned, filtered and/or mixed with analogue mixers (or lock-in amplifiers) to make a harmonic signal is received by a digitizing unit (2600). The digitizing unit (2600) will transmit digital signals to the processing unit (2700). The processing unit (2700) will calculate a result for a H2 measurement based on the signal received form the digitizing unit (2600). The processing unit will transmit measurement results on the output part of input/output interfaces (2720). The processing unit (2700) as well as the complete apparatus will be powered via the power input cables (2710). The input power could be sourced from batteries, the mains power grid or any other suitable power source. The processing unit (2700) controls the complete instrument including the laser temperature control and the laser ramp scan (1000) which scans the tunable laser across at least one absorption feature of a gas that could potentially be present in the target gas (500). The processing unit (2700) also controls the data sampling in the receiver unit (650) as well as other housekeeping tasks internal in the gas analyzer according to the current invention. The Figure is simplified and not to scale and the required distances between optical surfaces are not shown in the Figure. The Figure serves as an example to explain the basic concept of the gas analyzer.

Figure 2:
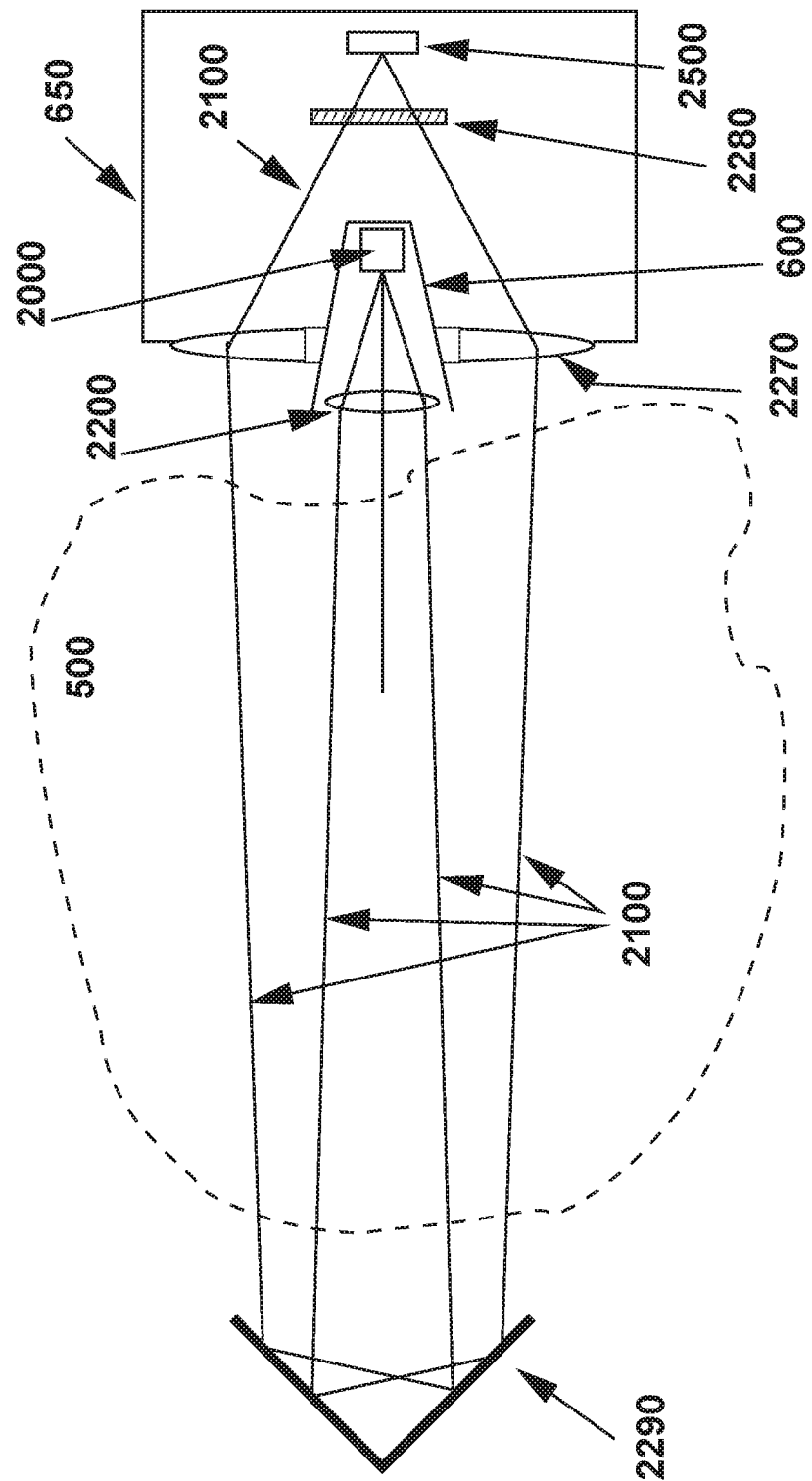
FIG. 2 shows the optical system of a dual path configuration used for dual path in-situ stack analyzer and for open path sensor/detector.
Figure 3:
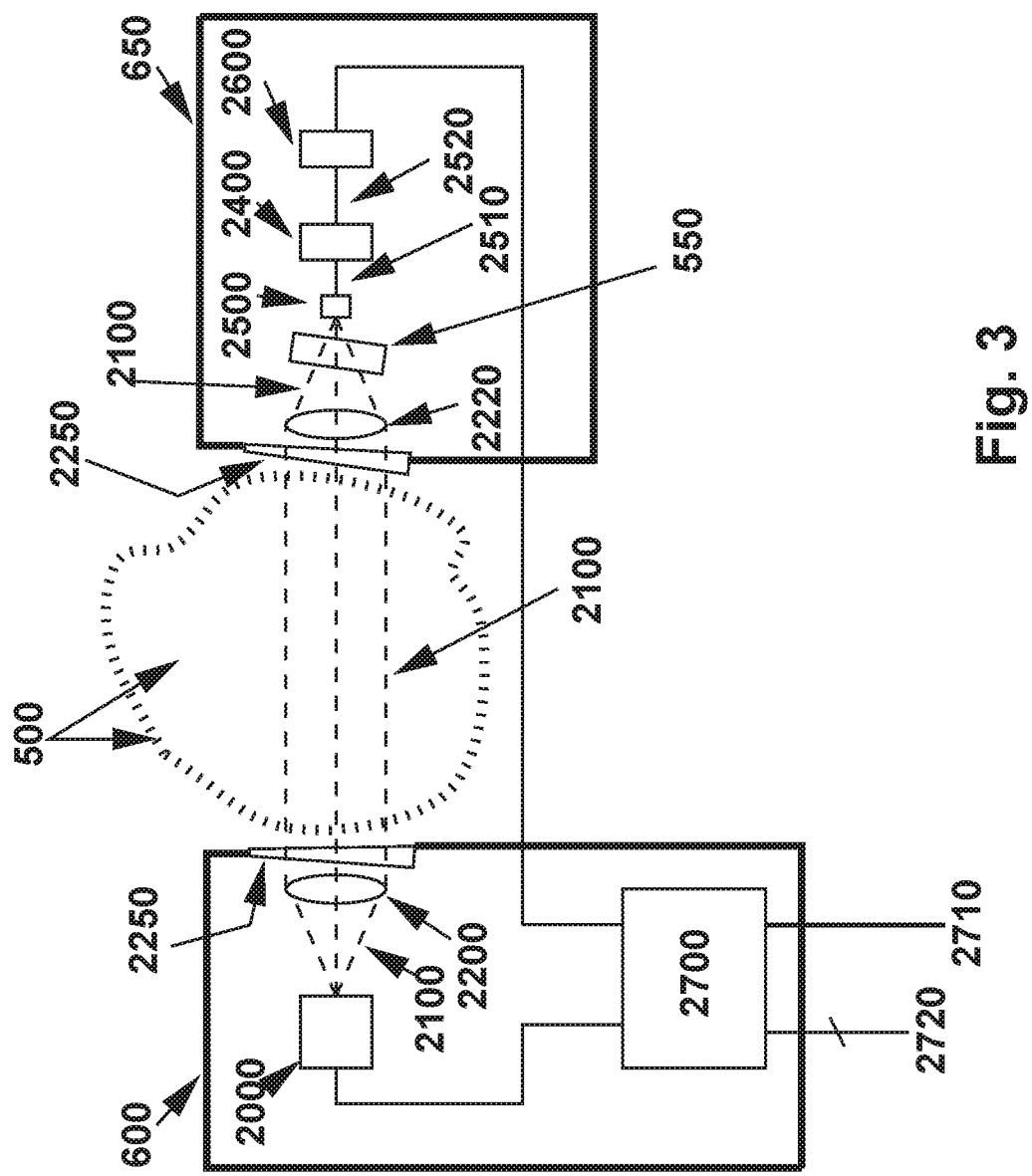
FIG. 3 is similar to FIG. 1, but a reference cell (550) is placed in the optical path. The Figure serves as an example to explain the basic concept of the gas analyzer.

FIG. 2 shows the optical system of a dual path configuration used for dual path stack analyzers and for open path sensors/detectors. The laser beam (2100) In a dual path configuration passes through the target gas (500) twice. Typically this improves the detection limit by a factor of 2 compared to a single path configuration as shown in FIGS. 1 and 3. The tunable laser (2000) emits light in the form of a laser beam (2100), the laser beam (2100) being shaped by beam shaping optics (2200) into a collimated or preferably slightly diverging beam, the laser beam (2100) further passing through the target gas (500) a first time, then the laser beam (2100) being reflected by a retroreflector (2290), the laser beam (2100) going back and passing through the target gas (500) a second time, the returned laser beam being collected by and focused by a focusing lens (2270), the returned laser beam (2100) being focused onto a light sensitive detector (2500). The focusing lens (2270) has preferably been adapted to a coaxial design possibly with a centre hole that could accommodate the laser (2000). Similarly as with the transmitter-receiver configuration in FIGS. 1 and 3, the dual path configuration with a "transceiver" in FIG. 2 has also clearly defined transmitter parts (600) and receiver parts (650). The transmitter part (600) of the transceiver configuration mainly comprises a laser (2000) and a beam shaping optics (2200). The receiver part (650) of a transceiver configuration mainly comprises focusing optics (2270) and a detector (2500).

Optionally the receiver part can comprise an optical bandpass filter (2280). References to either a transmitter part or a receiver part will therefore be applicable both for a single path transmitter-receiver configuration and for a dual path, transceiver configuration. FIG. 2 is not to scale.

Analyzers according to FIGS. 1 and 2 in transmitter-receiver or dual-path configurations could also be implemented using mirror optics instead of lenses for the functionality of one or more of the lenses. The optical system of the dual-path open path configuration could be replaced by a telescope design like a Newtonian telescope.

The retroreflector of the dual path solution could be implemented in different ways using either a cube corner, a matrix of cube corners, or simpler light reflecting devices or even light reflecting tape.

FIG. 3 is similar to FIG. 1, but a reference cell (550) is placed in the optical path. The cell (550) could contain a gas that has sufficient absorption at a wavelength close to the wavelength of H2 so that it could be used to verify that the laser wavelength is scanned in the correct wavelength range. The cell (550) could optionally be mounted using an actuator capable of inserting the cell (550) into the optical path when needed and then be removed from the optical path when not needed. The Figure is simplified and not to scale. The Figure serves as an example to explain the basic concept of the gas analyzer.

Figure 4:
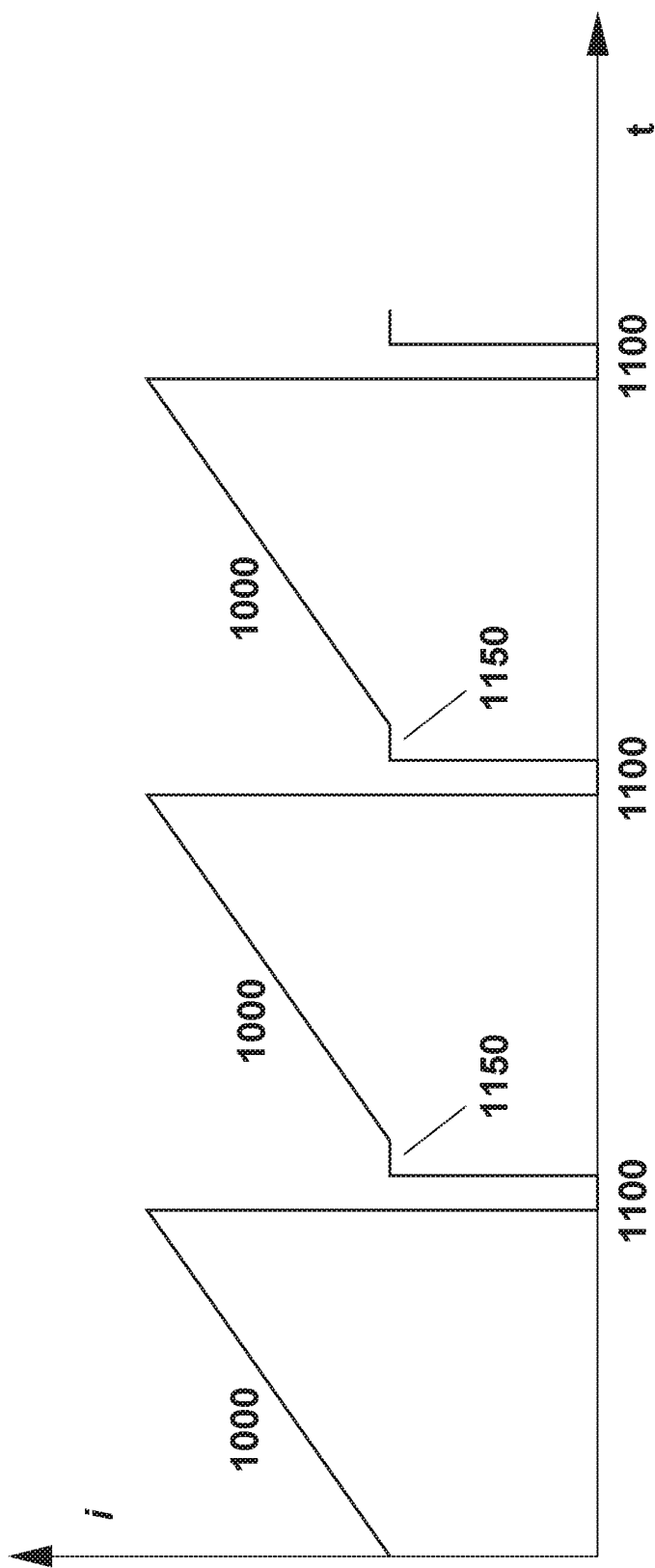
FIG. 4 shows several laser scan cycles or ramp scans for a gas analyzer working with direct absorption technology. The laser current is shown.

FIG. 4 shows several laser scan cycles or ramp scans for a gas analyzer working with direct absorption technology. The laser current is shown. A current ramp (1000) scans the wavelength of the laser across at least one spectral absorption feature for a target gas to be measured. The current ramp is not necessarily linear with time but could be of more complex shape. An optional dark reference (1100) time slot follows where the laser current is off. A short time slot (1150) where the laser current is on and where the laser current is constant to allow the laser to stabilise after the dark reference follows. Then a new laser scan ramp is performed for the next cycle. FIG. 4 is not to scale.

Figure 5:
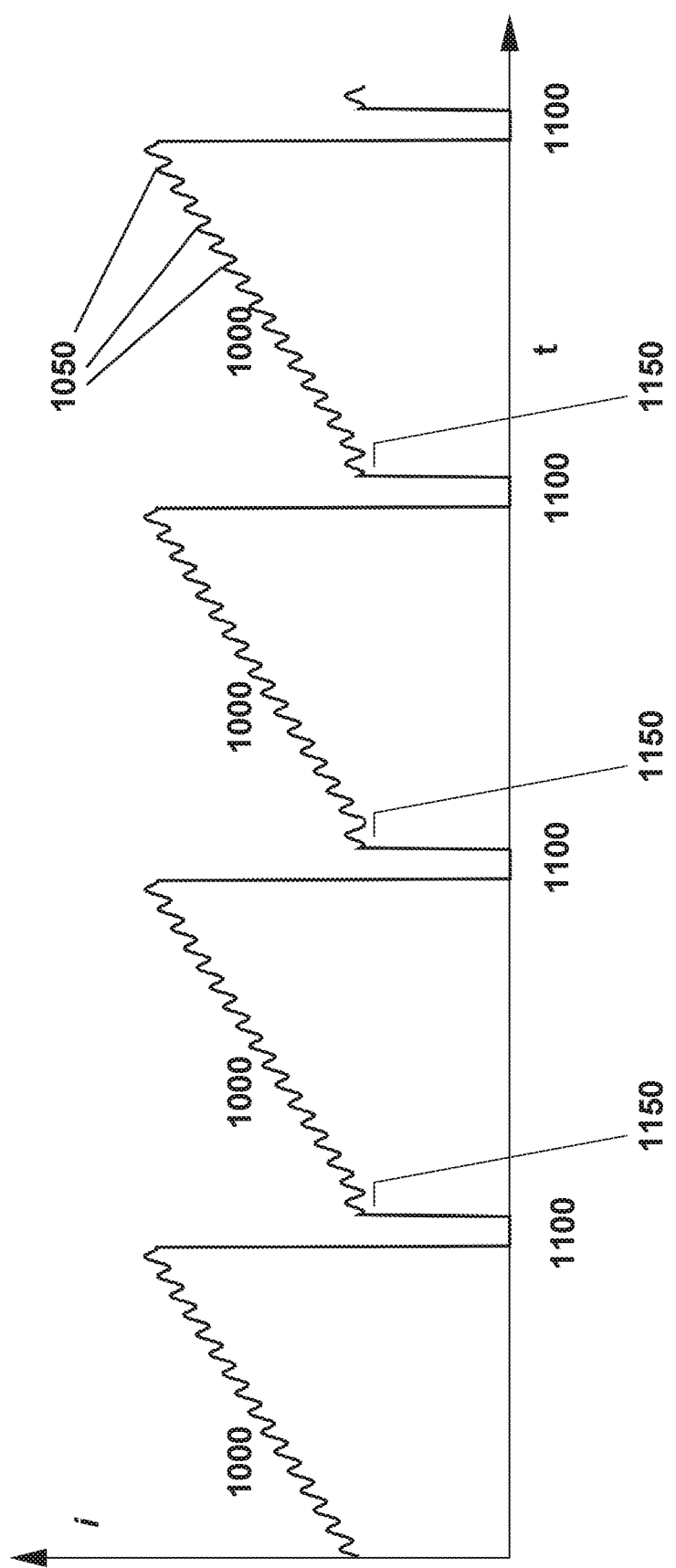
FIG. 5 is similar to FIG. 4 but for wavelength modulation spectroscopy and second harmonic detection.

FIG. 5 is similar to FIG. 4 but for wavelength modulation spectroscopy and second harmonic detection. A sine wave (1050) is added to the laser current whenever the laser is on. The laser current is shown. A current ramp (1000) scans the wavelength of the laser across at least one spectral absorption feature for a target gas to be measured. The current ramp is not necessarily linear with time but could be of more complex shape. An optional dark reference (1100) time slot follows where the laser current is off. A short time slot (1150) where the laser current is on and where the laser current is constant to allow the laser to stabilise after the dark reference follows. Then a new laser scan ramp is performed for the next cycle. FIG. 5 is not to scale and is made to illustrate techniques.

Figure 6:
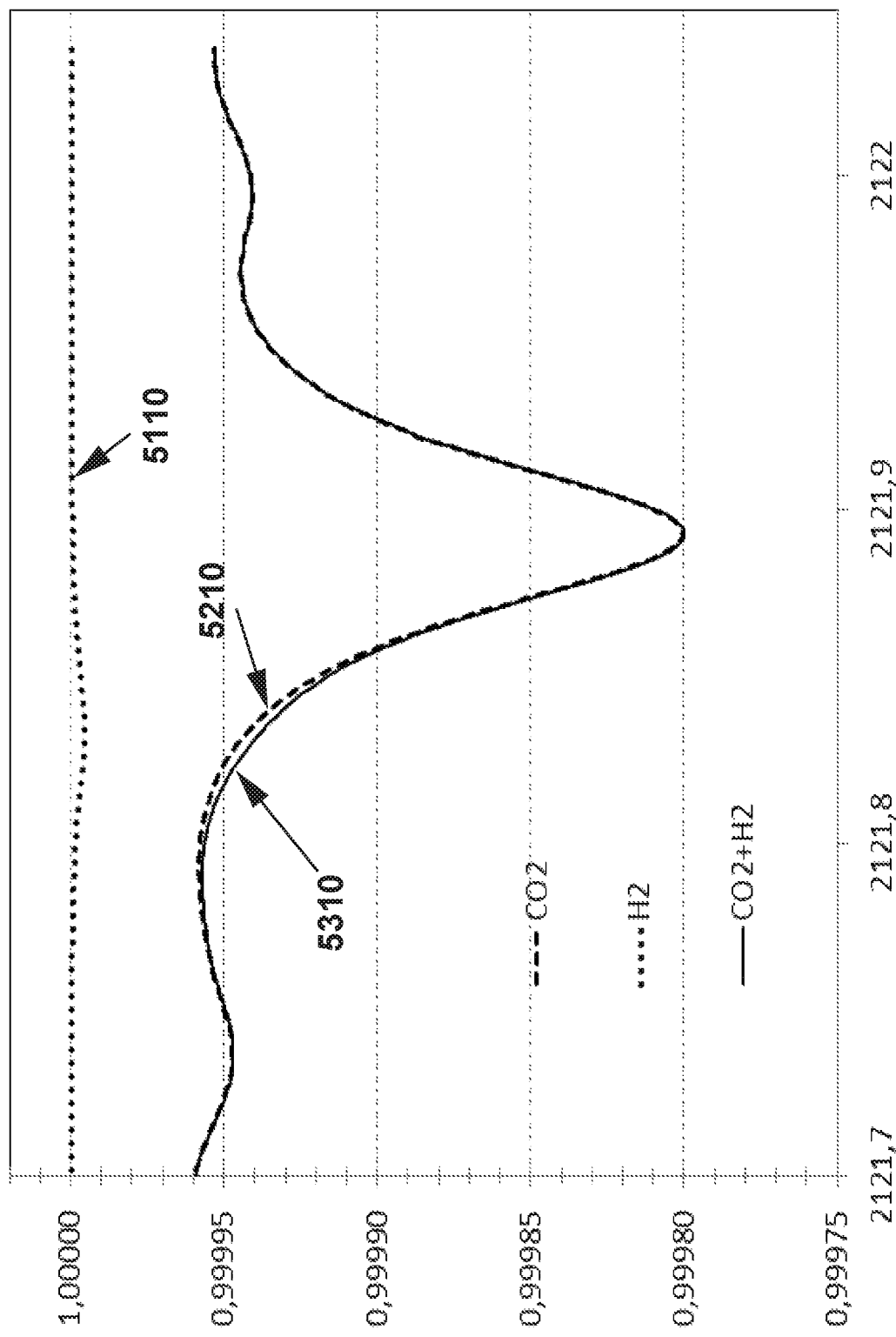
FIG. 6 shows the default HITRAN modelling of the transmission spectrum at T=23° C., P=1 atm, H2=1% v*meter, CO2=10% v*meter. Wavelength in nm is given on the X-axis and transmission on the Y-axis.

FIG. 6 shows the default HITRAN modelling of the transmission spectrum at T=23° C., P=1 atm, H2=1% v*meter, CO2=10% v*meter. Wavelength in nm is given on the X-axis and transmission on the Y-axis. The hydrogen concentration is 1% volume (v) for one meter (similar to 0.5% v for 2 meters). The CO2 concentration is 10% volume (v) for 1 meter (similar to 5% v at 2 meters). The transmission spectrum of H2, (5110) and the transmission spectrum of CO2 (5210) as well as the combined transmission spectrum of H2 and CO2 (5310) are shown in the Figure. As seen, the hydrogen absorption is very weak. Attempts to use HITRAN for modelling will lead to a conclusion that it is not feasible to measure H2 on pathlength of 1 meter with the required LOD (0.2% v*meter), especially in presence of CO2.

Figure 7:
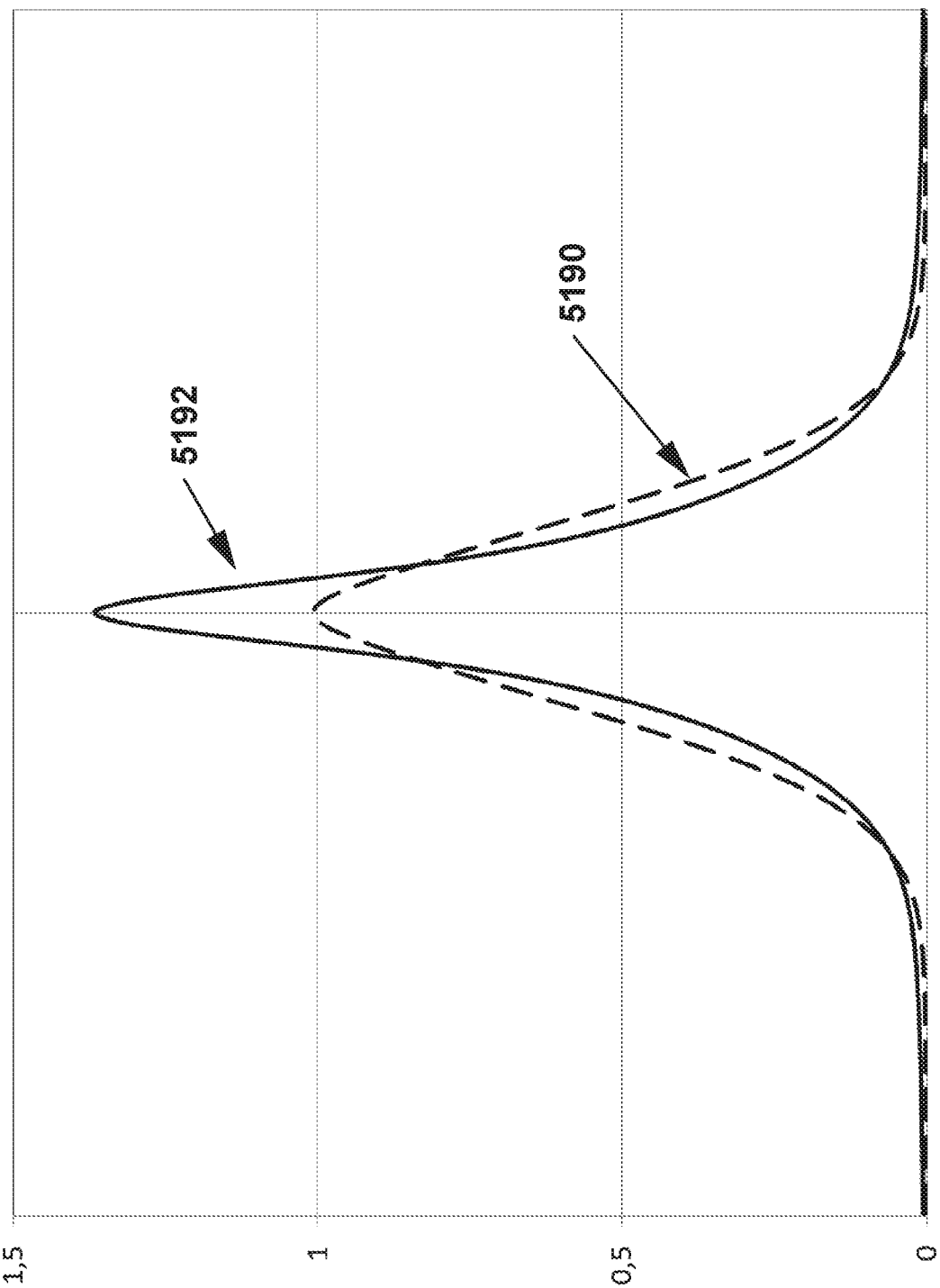
FIG. 7 shows the actual H2 line profile (5192) and the Voigt profile (5190) with the same integral for the same absorption line for P=1 atm of air. Units on the axis are arbitrary. The peak intensity of the Voigt profile has been normalized to "1".

FIG. 7 show the modelled actual H2 line profile (5192) and the Voigt profile (5190) with the same integral. Units on the axis are arbitrary, but the peak intensity of the Voigt profile has been normalized to "1". The pressure is 1 atm. The Voigt profile is modelled using the actual broadening coefficient, which is about 10 times less than the HITRAN default value. The Voigt profile with this relatively weak broadening at 1 atm pressure is very close to the Gaussian profile because the Gaussian component due to Doppler broadening dominates over the Lorentzian component due to collisional broadening. This is very unusual. Generally, absorption profiles of gases at 1 atm pressure are of Voigt type with dominating Lorentzian component. Thus, even without taking into account the collisional narrowing effect, the H2 line appears relatively narrow compared to absorption line of other gases. With collisional narrowing taken into account the H2 line profile (5192) deviates from the Voigt type, HWHM becomes even narrower than Doppler HWHM and the peak amplitude increases.

Figure 8:
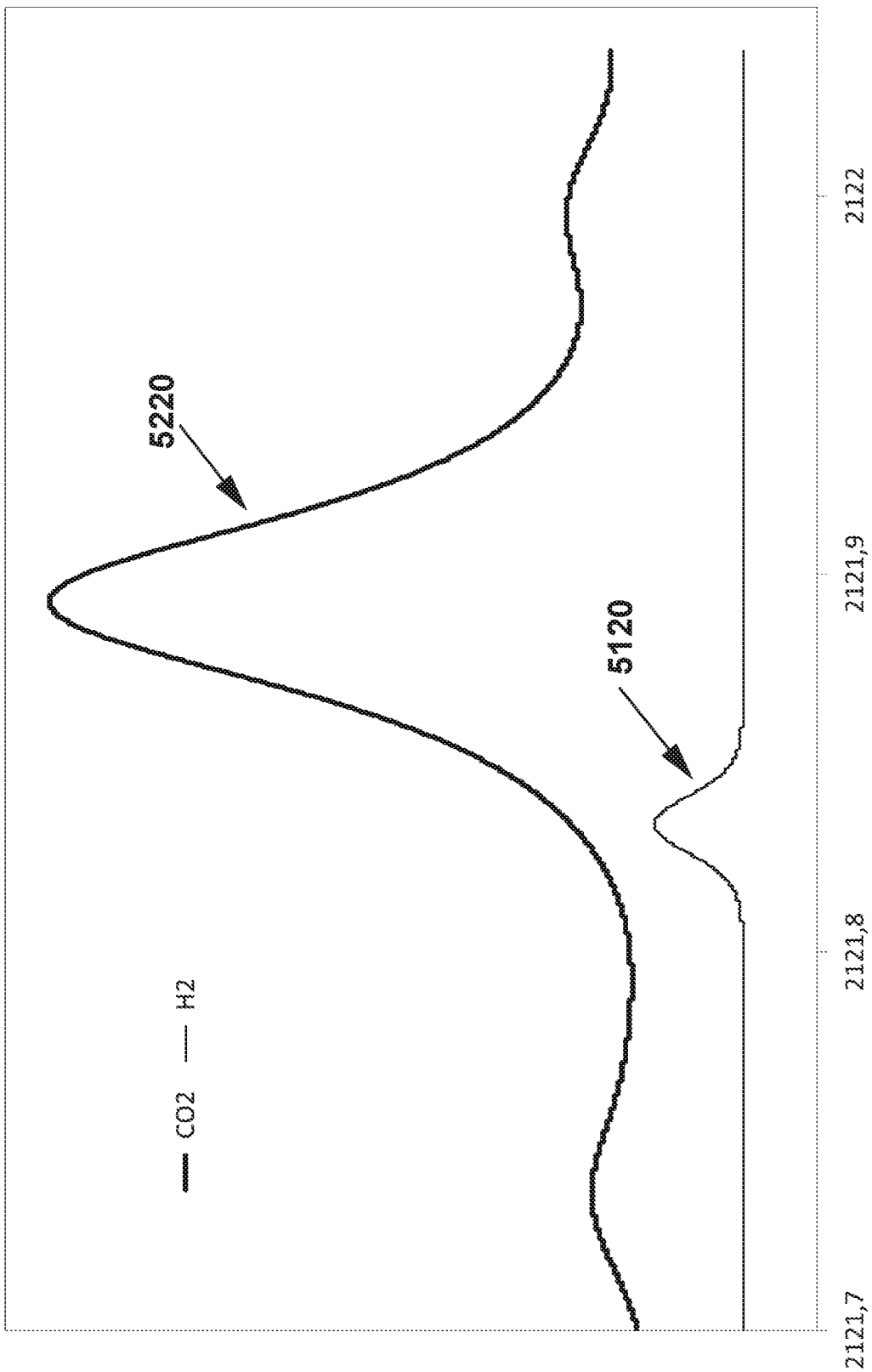
FIG. 8 shows the modelled (direct) absorption signals for 10% v CO2 (5220) and 1% v H2 (5120). The detected transmission signal is normalized to 100% transmission, and then inverted to get positive pure absorption signal. Wavelength in nm is given on the X-axis and arbitrary units on the Y-axis.

FIG. 8 shows the modelled (direct) absorption signals for 10% v CO2 (5220) and 1% v H2 (5120) at 1 atm. The detected signal is normalized to 100% transmission, and then inverted to get positive pure absorption signal. Logarithm of the transmission that should be taken according to Beer-Lambert law is neglected due to very weak absorption. Wavelength in nm is given on the X-axis and arbitrary units on the Y-axis. In contrast to default HITRAN modelling, this modelling resembles the real situation: the H2 line is much narrower than the interfering CO2 line. The narrow width of the H2 line results in significantly larger peak absorbance for the same concentration, which is an additional important benefit for detectability of H2.

Figure 9:
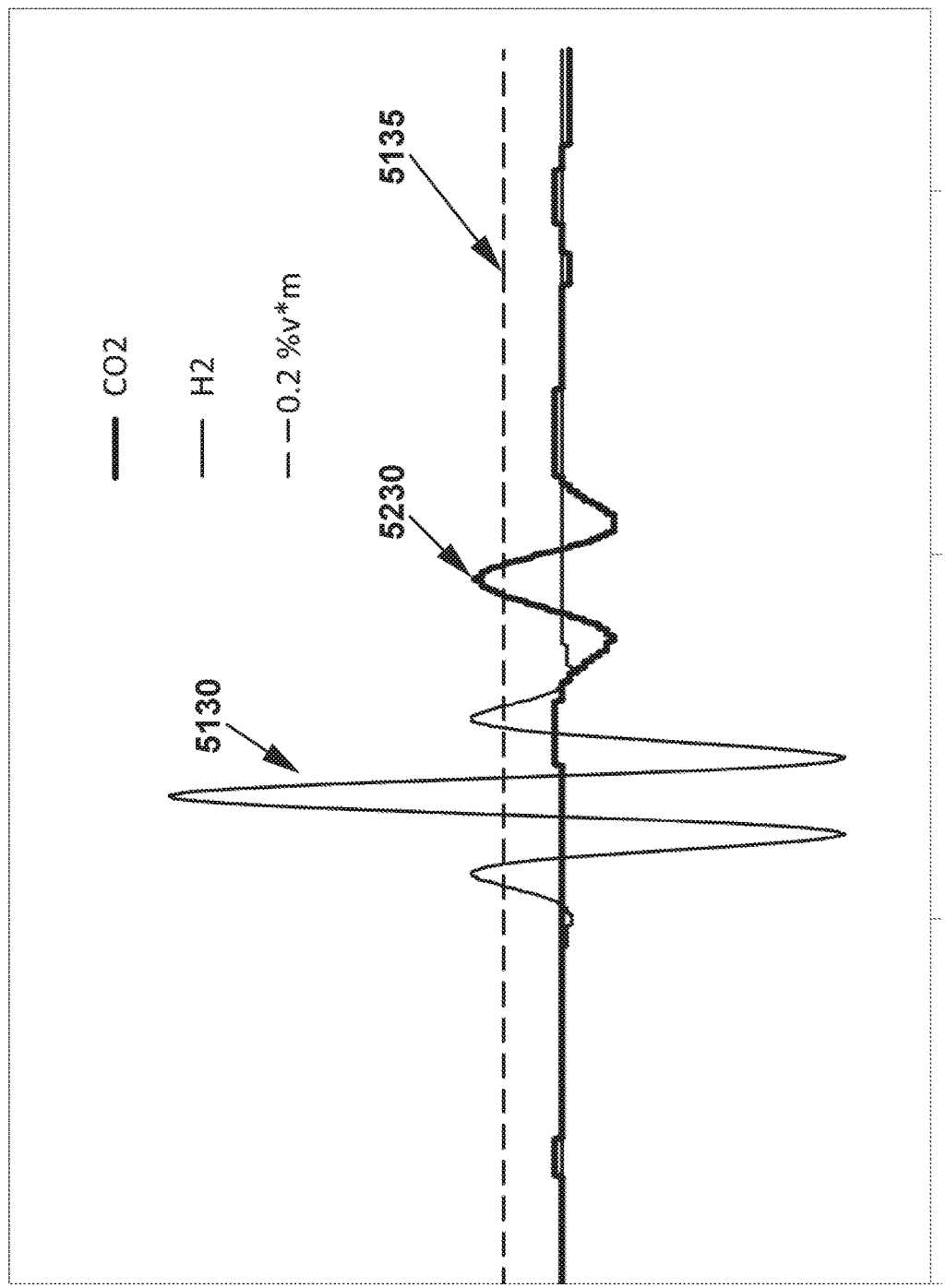
FIG. 9 shows filtered direct absorption signals. The signals as in FIG. 8 after filtering using bandpass SG filter (6-th derivative). Filtered curves for CO2 (5230) and H2 (5130) as well as required LOD corresponding to 0.2% v*meter H2 (5135) are shown. Wavelength in nm is given on the X-axis and arbitrary units on the Y-axis.

FIG. 9 shows filtered direct absorption signals (modelled). The signals as in FIG. 8 after filtering using bandpass SG filter (6-th derivative). Filtered curves for CO2 (5230) and H2 (5130) as well as the level corresponding to LOD of 0.2% v*m H2 (5135) are shown. Wavelength in nm is given on the X-axis and arbitrary units on the Y-axis. Here it is demonstrated that appropriate digital filtering allows discriminating between the H2 and CO2 lines. The CO2 line is greatly suppressed and the CO2 signal at the position of the H2 peak is well below the required LOD. The H2 peak of the filtered signal is well isolated from the CO2 signal, and thus the H2 peak can be used for H2 concentration measurements without CO2 interference.

Figure 10:
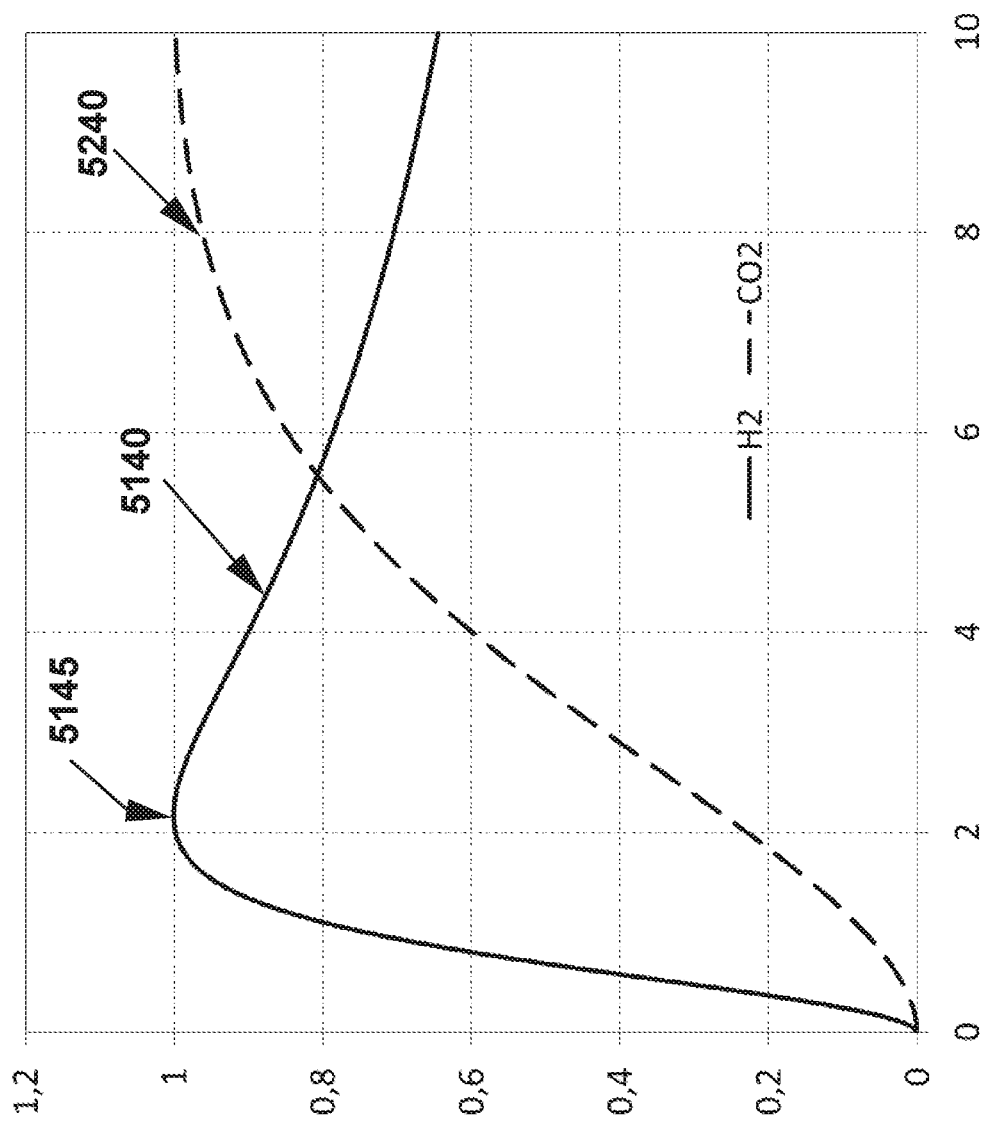
FIG. 10 shows modelled peak signals for the H2 and CO2 2f WMS line shapes as functions of the laser modulation amplitude. On the X-axis the ratio of modulation amplitude to the H2 HWHM is shown while the peak signal amplitude is shown on the Y-axis. Peak amplitudes for both H2 and CO2 WMS lineshapes are normalized to "1".

FIG. 10 shows peak signals for the H2 and CO2 2f WMS line shapes as functions of the laser modulation amplitude.

The largest peak signal (5145) is obtained when the modulation amplitude is about 2.2 of the absorption line HWHM. The positive peak amplitude of the 2f line shape as a function of the ratio of the modulation amplitude to an absorption line HWHM is schematically shown in FIG. 10. Two examples are demonstrated: a plot for the H2 line (5140) and a corresponding plot for the CO2 line (5240). The 2f signal for H2 is maximized (5145) for the modulation amplitude around 2.2 of the H2 HWHM. The corresponding amplitude for the CO2 line shape at this modulation amplitude is about 0.2, which is 5 times less than the top value. Thus, by proper choice of the modulation amplitude, the CO2 signal is suppressed several times while the H2 signal is optimized. On the X-axis the ratio of modulation amplitude to the H2 HWHM is shown while the peak signal is shown on the Y-axis.

Figure 11:
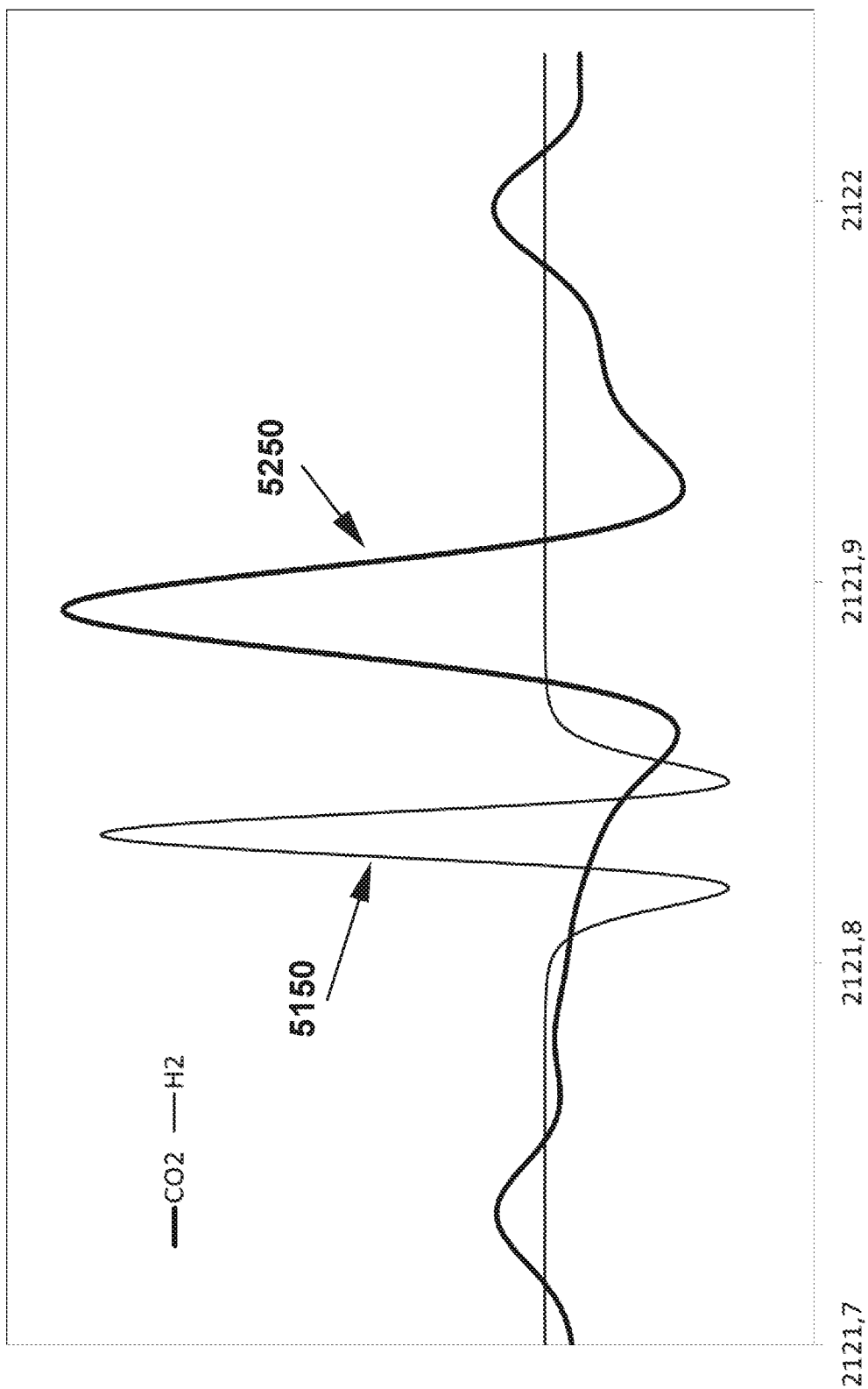
FIG. 11 shows the modelled 2f WMS absorption signals for the same absorption spectra of H2 and CO2 as in FIG. 8. Wavelength in nm is given on the X-axis and arbitrary units on the Y-axis.

FIG. 11 shows the modelled 2f WMS absorption signals for the same absorption spectra of H2 and CO2 as in FIG. 8. The modulation amplitude is about 2 times H2 HWHM. As seen the CO2 line is greatly reduced (compare with FIG. 8), but this is not enough to completely remove the interference. The Figure shows modelled WMS 2f signals for 10% v CO2 (5250) and 1% v H2 (5150). Wavelength in nm is given on the X-axis and arbitrary units on the Y-axis.

Figure 12:
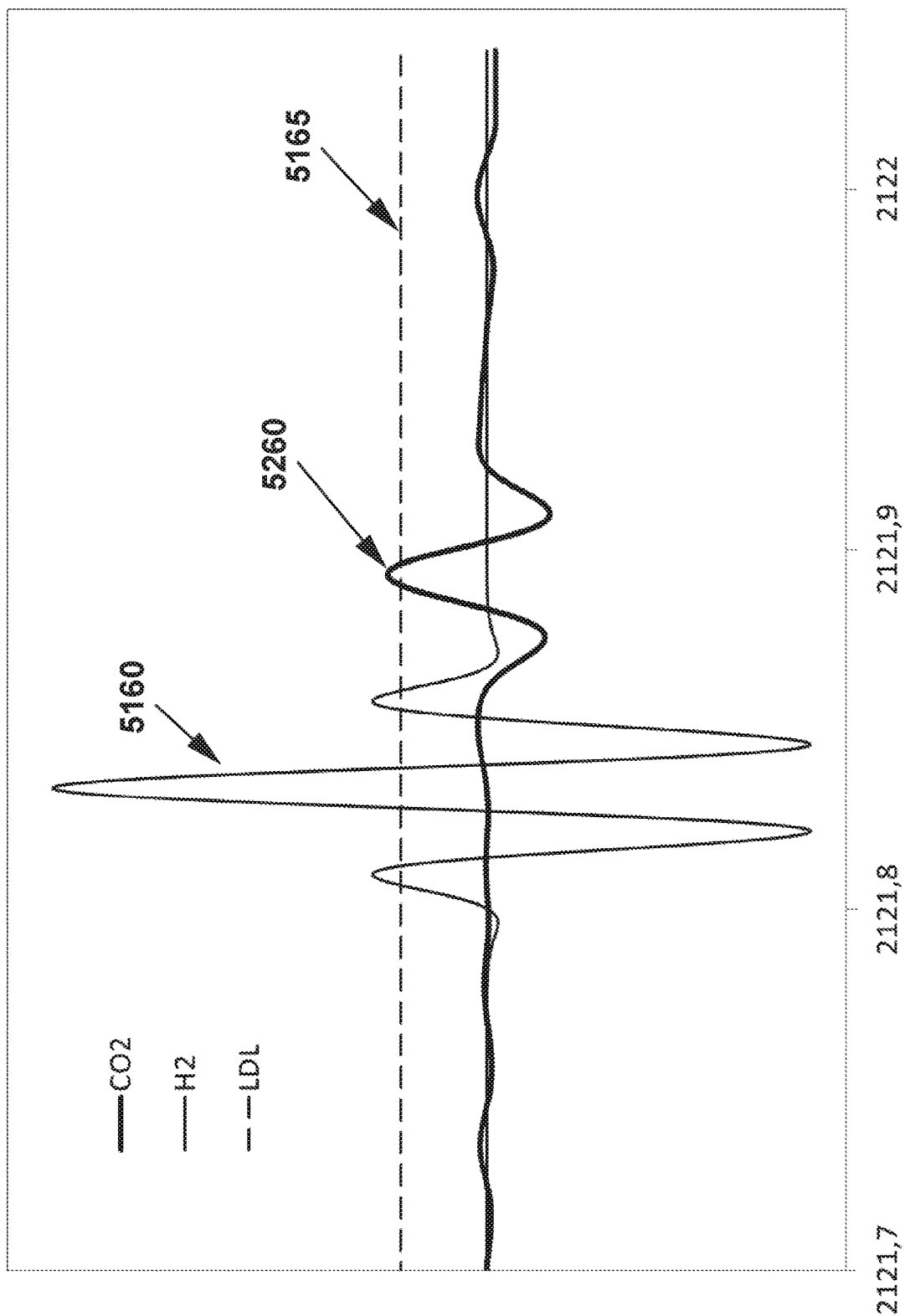
FIG. 12 shows filtered WMS absorption signals. The signals as in FIG. 11 after filtering using bandpass SG filter (4-th derivative). The H2 signal (5160), the CO2 signal (5260) as well as required LOD corresponding to 0.2% v*meter H2 (5165) are shown. Wavelength in nm is given on the X-axis and arbitrary units on the Y-axis.

FIG. 12 shows filtered WMS absorption signals. The signals as in FIG. 11 after filtering using bandpass SG filter (4-th derivative). The H2 signal (5160), the CO2 signal (5260) as well as the limit of detection, LOD, (5165) are shown. Wavelength in nm is given on the X-axis and arbitrary units on the Y-axis. The WMS CO2 signal is suppressed while the H2 signal is optimized. The CO2 signal at the position of the H2 peak is well below the required LOD. The H2 peak of the filtered WMS signal is well isolated from the CO2 signal, and thus the H2 peak of the filtered WMS signal can be used for H2 concentration measurements without CO2 interference.

Figure 13:
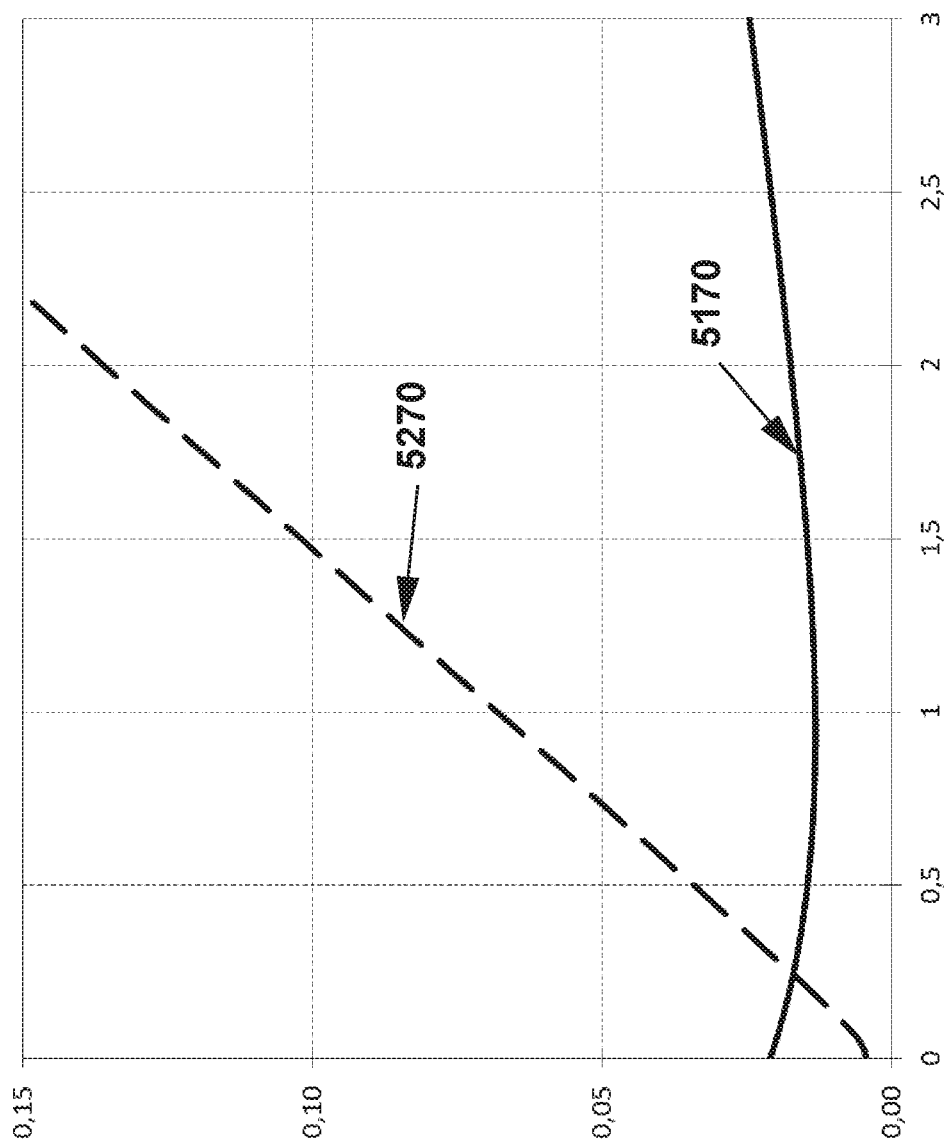
FIG. 13 shows a plot of the linewidths of H2 (5170) and CO2 (5270) as functions of the absolute pressure in atm. The absolute pressure in atm is shown on the X-axis and HWHM in cm-1 is shown on the Y-axis.

FIG. 13 shows a plot of the linewidth (HWHM) of H2 (5170) and CO2 (5270) as a function of the absolute pressure in atm. As can be seen, the linewidth of H2 (5170) decreases with pressure from 0 to 1 atm, then it is relatively flat around 1 atm and up to around 2 atm. As can also be seen the linewidth of CO2 (5270) is increasing at a much higher rate than the linewidth of H2 (5170). The difference in HWHM between the H2 and CO2 lines increases with pressure. This is beneficial for digital signal filtering techniques for both DAS and WMS to discriminate between H2 and CO2 when the pressure increases. Additional benefit in case of WMS signals is that the CO2 2f WMS signal will be suppressed more than 5 times (FIG. 10) when pressure is above 1 atm. The absolute pressure in atm is shown on the X-axis and HWHM for the absorption lines in cm-1 is shown on the Y-axis.

Figure 14:
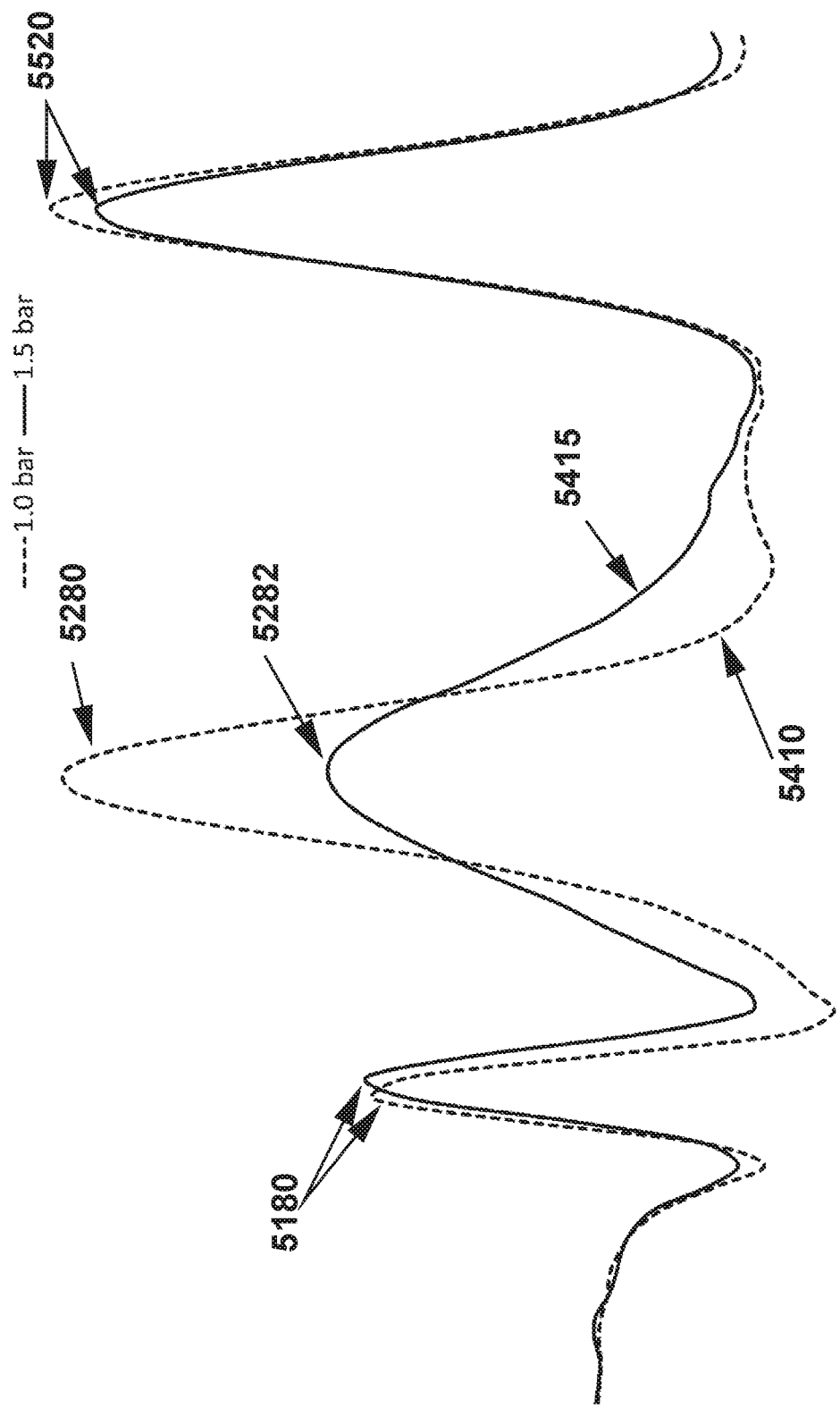
FIG. 14 shows measured 2f WMS signals of a gas mixture containing H2 and CO2 where the pressure was 1 atm (5410) and 1.5 atm (5415) respectively. In the horizontal direction (X-axis) we have increasing wavelength according to the laser current ramp tuning. On the Y-axis we have WMS signal with arbitrary unit.

FIG. 14 shows real measurements of H2 and CO2 where the pressure has been 1 atm (5410) and 1.5 atm (5415) respectively. For both curves the H2 concentration is 1% and the CO2 concentration is 10% in a multipass cell with optical path length of 11 meters. WMS has been used and the curves of the absorption spectrum (5410, 5415) are before any filtering has been performed. The modulation amplitude of the laser is at optimum for the H2 HWHM at 1 atm (ref. 5145 in FIG. 10). A reference sealed cell is inserted in the optical path. The internal length of the cell is 2 mm. The external length (that includes the cell windows) is 4 mm. The cell contains N2O at somewhat reduced pressure (below 1 atm). The peaks (5520) in the WMS spectra (5410, 5415) belong to N2O absorption in this sealed cell and thus the N2O peak (5520) does not depend on pressure of the multipass cell containing H2 and CO2. The H2 peaks (5180) are relatively similar for both pressures 1.0 and 1.5 atm. The H2 WMS signal is influenced very little from the pressure change, since the linewidth in this pressure range is almost insensitive to pressure (ref. 5170 in FIG. 13). The H2 absorption lines exhibit pressure induced line shift effect. This explains the slight difference in the H2 peak positions (5180). In contrast to the H2 peak, the CO2 peak at 1.5 atm (5282) is significantly weaker than the CO2 peak at 1.0 atm (5280). Since the CO2 line at 1.5 atm is significantly broader than at 1.0 atm (ref. 5270 in FIG. 13), the ratio of the laser modulation amplitude to CO2 HWHM is lower at 1.5 atm than at 1.0 atm (ref. 5240 in FIG. 10). As a result, the 2f WMS CO2 peak at 1.5 bar (5282) is weaker than the CO2 peak at 1.0 bar (5280). In the measured signals, another CO2 line exists at the position of the N20 line (5520). This CO2 line is weak and has no significant influence on the signals. However, that explains the difference in the N2O peaks (5520) between 1.0 atm to 1.5 atm. The horizontal direction (X-axis) shows direction of the increasing wavelength. On the Y-axis we have WMS signal with arbitrary unit.

Figure 15:
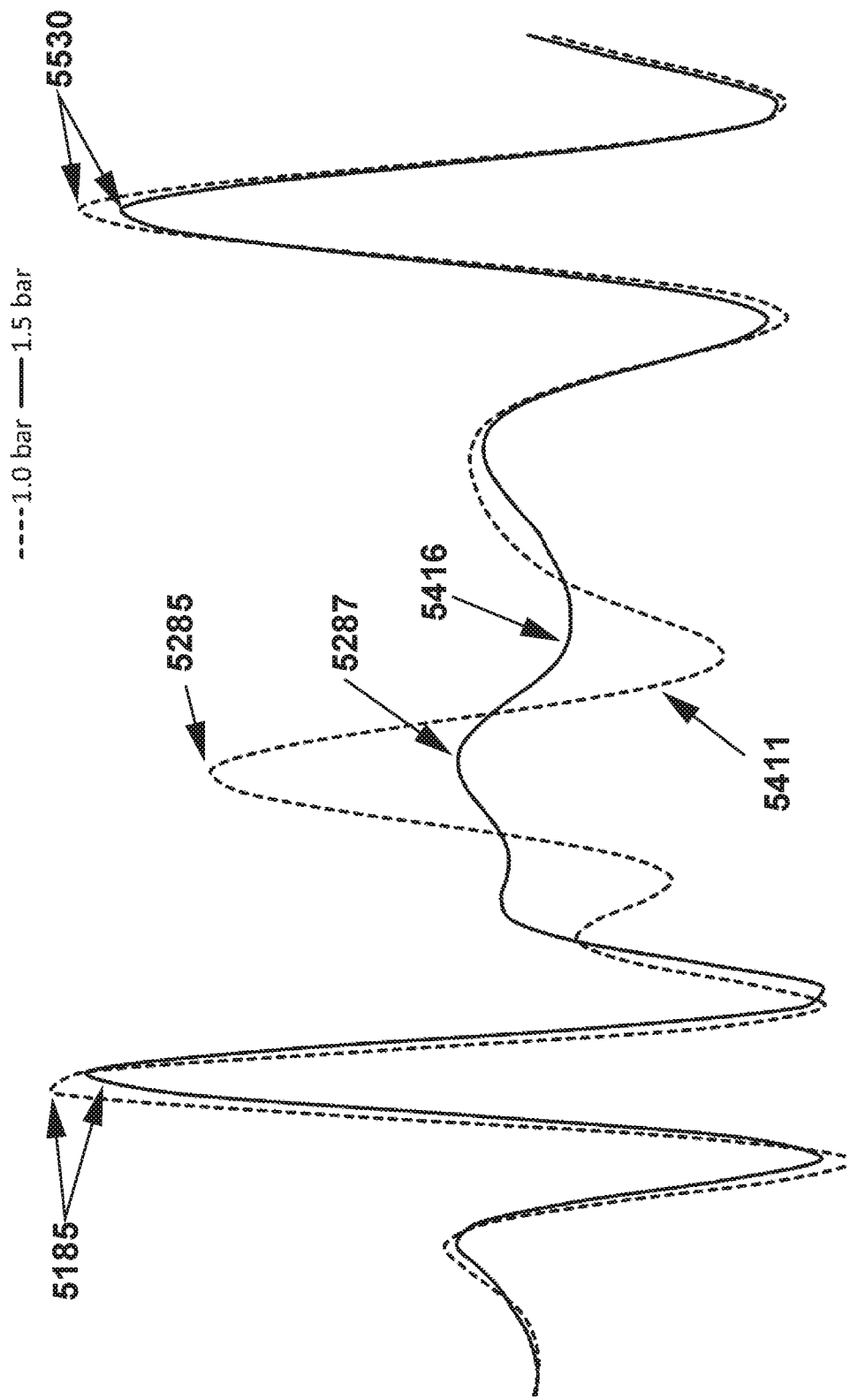
FIG. 15 shows the WMS signals from FIG. 14 after filtering using a fourth order bandpass filter. Curves in FIG. 15 are based on pressure 1.0 atm (5411) and 1.5 atm (5416). On the Y-axis we have filtered WMS signal with arbitrary unit.

FIG. 15 is based on WMS signals from FIG. 14 and shows the corresponding WMS signals after filtering using a fourth order bandpass filter. Curves in FIG. 15 correspond to pressure 1.0 atm (5411) and 1.5 atm (5416). Compared to FIG. 14 the H2 peaks (5185) are stronger than the CO2 peaks (5285, 5287). The filtering suppresses the CO2 peak at 1.5 atm (5287) significantly more than the same peak at 1.0 atm (5285). The CO2 line amplitude at 1.5 atm (5287) is around a fifth of the CO2 line amplitude at 1.0 atm (5285). The H2 peak is well separated from the CO2 peak for both pressures. It is clearly seen that elevated pressure is beneficial for H2 detection in presence of CO2.

Figure 16:
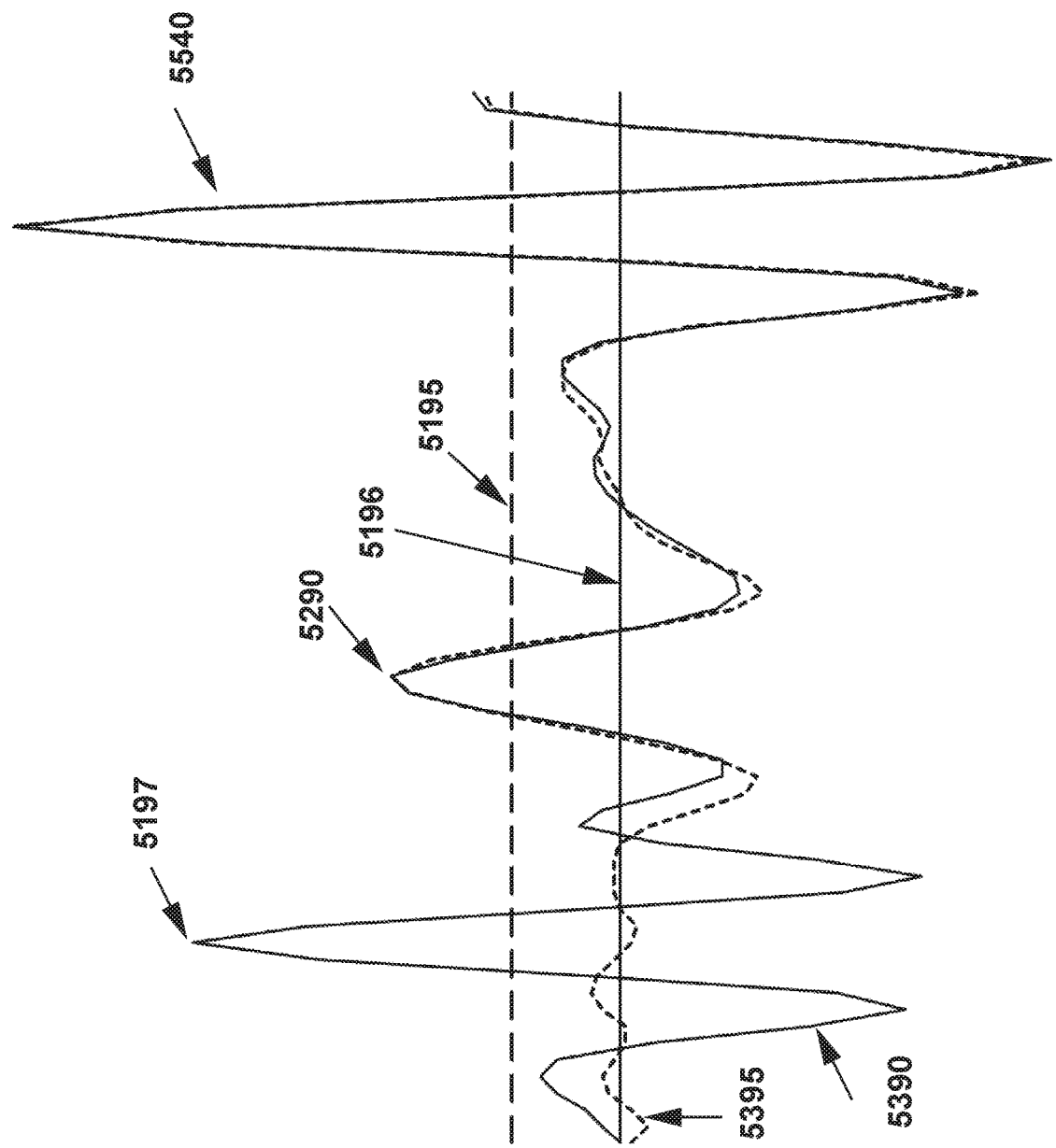
FIG. 16 shows measured 2f WMS signals of 10% v CO2 with 1% v H2 (5390) and without H2 (5395) gas mixtures in a single pass cell of 1 meter length. The signals are after filtering using a fourth order bandpass filter. The zero signal level (5196) as well as the signal level corresponding to 0.2% v*meter H2 (5195) are shown. In the horizontal direction (X-axis) we have increasing wavelength according to the laser current ramp tuning. On the Y-axis we have WMS signal with arbitrary unit.

FIG. 16 shows real measurements of a gas analyzer according to the current invention. The analyzer embodiment is transmitter-receiver (600, 650) combination using WMS. The measurements of H2 and CO2 are performed using a single pass cell of 1 meter length at 1 atm pressure. The signals shown are after filtering of the WMS signals using a fourth order bandpass filter. The signals of 10% v CO2 with 1% v H2 (5390) and without H2 (5395) are plotted together with the zero signal level (5196) and the level for required LOD of 0.2% v*meter H2 (5195). Noise around the H2 peak (5197), as seen on the signal curve without H2 (5395), is well below required LOD (5195). Interference from the CO2 absorption line at the position of the H2 peak has been suppressed to below noise level. The peaks (5540) in the signals (5390, 5395) belong to N2O absorption in a reference sealed cell placed in front of the detector. In the horizontal direction (X-axis) we have increasing wavelength according to the laser current ramp tuning. On the Y-axis we have WMS filtered signal with arbitrary unit.

Figure 17:
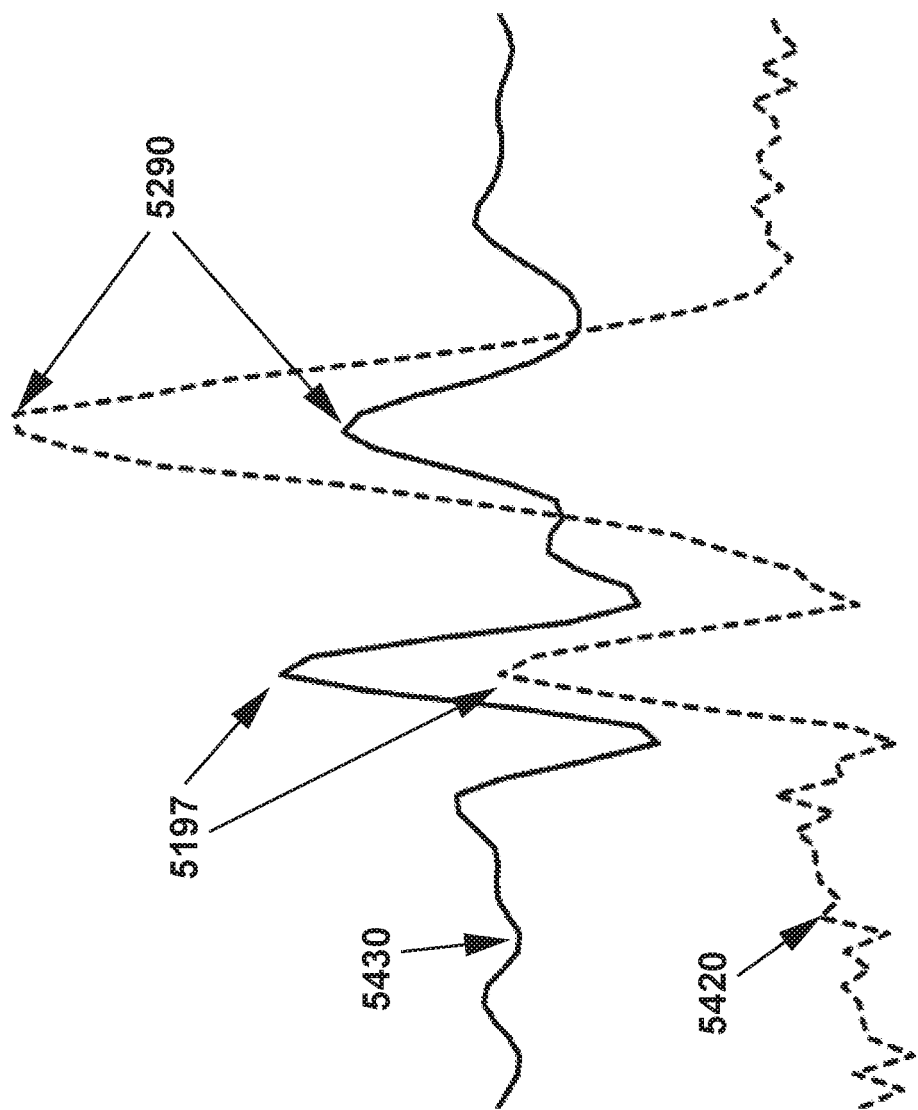
FIG. 17 shows measured 2f WMS signal of 10% v CO2 with 1% v H2 (5420) in a single pass cell of 1 meter length while the modulation amplitude is adapted for H2 measurements. The signal after filtering using a fourth order bandpass digital filter adapted for H2 measurements is shown (5430). The peak position of the H2 absorption signal (5197) and the peak position of the CO2 absorption signal (5290) are shown. In the horizontal direction (X-axis) we have increasing wavelength according to the laser current ramp tuning. On the Y-axis we have WMS signal with arbitrary unit.

FIG. 17 shows real measurements of a dual gas H2 and CO2 analyzer according to the current invention. The analyzer embodiment is transmitter-receiver (600, 650) combination using WMS. The measurements of gas mixture of 1% v H2 and 10% v CO2 in nitrogen balance are performed using a single pass cell of 1 meter length at 1 atm pressure. The analyzer is in the H2 measurement mode. The modulation amplitude is adjusted (reduced) to match the narrow H2 absorption line and the corresponding WMS signal is shown (5420). The CO2 WMS signal is greatly suppressed due to the very low modulation amplitude with respect to the CO2 linewidth. The CO2 signal is further suppressed using a fourth order bandpass digital filter adapted to pass the H2 absorption signal and supress the CO2 signal (5430). The peak of the H2 signal (5197) is well separated from the CO2 signal (5290) such as H2 can be measured without interference from CO2. In the horizontal direction (X-axis) we have increasing wavelength according to the laser current ramp tuning. On the Y-axis we have WMS signal with arbitrary unit.

Figure 18:
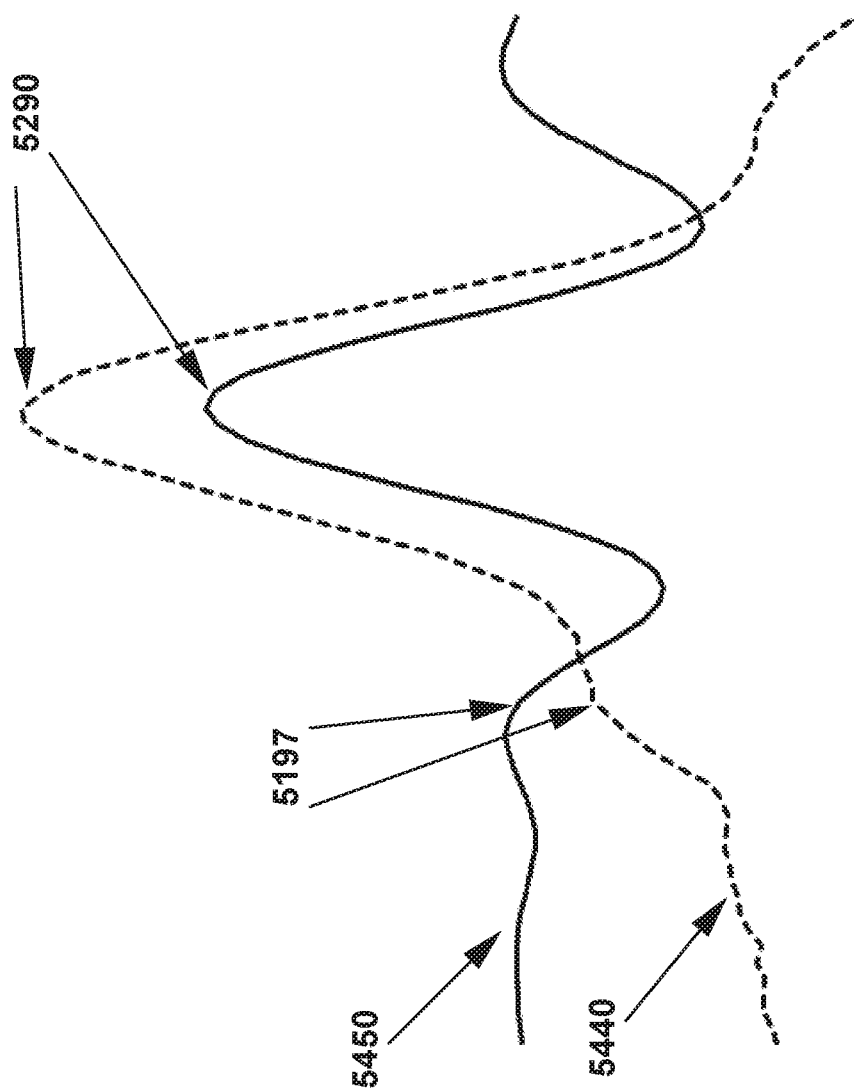
FIG. 18 shows measured 2f WMS signal of 10% v CO2 with 1% v H2 (5440) in a single pass cell of 1 meter length while the modulation amplitude is adapted for CO2 measurements. The signal after filtering using a fourth order bandpass filter adapted for CO2 measurements is shown (5450). The peak position of the CO2 absorption signal (5290) and the position of the H2 absorption signal (5197) are shown. In the horizontal direction (X-axis) we have increasing wavelength according to the laser current ramp tuning. On the Y-axis we have WMS signal with arbitrary unit.

FIG. 18 shows real measurements of a dual gas H2 and CO2 analyzer according to the current invention. The analyzer embodiment is transmitter-receiver (600, 650) combination using WMS. The measurements of gas mixture of 1% v H2 and 10% v CO2 in nitrogen balance are performed using a single pass cell of 1 meter length at 1 atm pressure. The analyzer is in the CO2 measurement mode. The modulation amplitude is adjusted (increased) to match the CO2 absorption line and the corresponding WMS signal is shown (5440). The H2 WMS signal is suppressed due to the very high modulation amplitude with respect to the H2 linewidth. The signal after using a fourth order bandpass digital filter adapted to pass the CO2 absorption signal and supress the H2 signal is shown (5450). The CO2 peak (5290) is well defined and the H2 peak (5197) is suppressed such as CO2 can be measured. In the horizontal direction (X-axis) we have increasing wavelength according to the laser current ramp tuning. On the Y-axis we have WMS signal with arbitrary unit.

A TLAS analyzer must provide a means for laser wavelength verification. The wavelength of tunable lasers of semiconductor type can be controlled by the laser current and temperature. By selecting the laser temperature, the wavelength is tuned to the absorption line of interest. Furthermore, by periodically changing the laser current the laser wavelength is scanned periodically around the absorption line. If the target gas is always present in the process gas, the absorption signal is used to calculate the target gas concentration and also it can be used to track the laser temperature such to hold the laser wavelength constantly at the absorption line. If the target gas is not always present in the process gas, there might be another gas constantly present, such as water vapour. If this gas component has absorption lines within the wavelength scan, the absorption signal from this component can be used to track the laser temperature. Another solution commonly used is to split the laser beam in the transmitter/transceiver unit into two paths: one beam is directed to the process, the other beam is directed through a reference cell located inside the transmitter/transceiver unit onto a reference detector. The reference cell contains some concentration of the target gas and is normally sealed. The absorption signal from the reference detector is used for wavelength verification and line locking by controlling the laser temperature (laser temperature tracking).

None of these approaches can be used for wavelength verification of the hydrogen analyzer. Hydrogen may not be present in process gas. For many safety applications it must never be present. Thus, the H2 absorption from process cannot be used for wavelength verification. The same is valid for the CO2 absorption or absorption of other gas components from the process gas since the components may not always be present. This implies that an H2 analyzer used for safety applications must ensure the internal wavelength control. Including a beam splitter, a reference cell with a detector in the transmitter unit close to the laser will inevitably introduce feedback noise into the laser. This is very unwanted, since to be able to detect H2 absorption, the best possible sensitivity must be achieved.

To use a reference cell filled with H2 either permanently in the optical path or periodically flipped into the optical path for the line tracking and verification using the H2 absorption signal is not feasible. The H2 absorption line is too weak for the purpose. It would require a relatively long cell with 100% H2, which is not practical and not safe.

The gas analyzer according to the current invention does not use beam splitting and an additional reference photodetector but can use a small sealed reference cell (550) that is placed in the Receiver, alternatively Transceiver, in front of the detector. The cell is filled with some concentration of a substitute gas that absorbs close by within the laser wavelength scan. The cell is either permanently in the optical path or it can be flipped into the optical path periodically for laser wavelength verification and span check by using absorption of the substitute gas. Such gas substitute could be N2O. The N2O 4712.55 cm-1 (2121.99 nm) absorption line can be used for the purpose. The spectral distance between the H2 line and the N2O line is 0.35 cm-1, such as both lines can be scanned by a single laser tuning ramp. The N2O line is relatively strong such as a very small reference cell, of just a few mm, filled with several % v of N2O (in N2 balance) is sufficient.

The gas analyzer according to the current invention can have two basic embodiments; either a combination of a transceiver module and a retroreflector or a transmitter-receiver (600, 650) combination. These two embodiments are in principle similar with exception that the optical path will be twice as long for the transceiver version compared to transmitter-receiver version. The transceiver version will have both transmitter (600) and receiver (650) functionality in the same box in one end of the optical path. The use of gas cells or sampling cells as described in prior art is not necessary for this invention but is still possible to use.

The transmitter (600) comprises a light source in the form of a tunable laser (2000) and normally also beam shaping optics (2200). The receiver (650) comprises focusing optics (2220) focusing the light signal onto a light sensitive detector (2500) which gives out an analogue electric signal (2510) being amplified or processed analogically in an analogue electronics unit (2400) and at a later stage being digitized in a digitization unit (2600). In addition, the overall system will comprise means to temperature regulate the laser (2000), modulate the laser (2000) with a mainly saw tooth ramp (1000) optionally also added a higher frequency sine wave (1050) on top of the ramp (1000). The system also comprises means to calculate gas concentrations and other parameters based on the digitized signal from the detector as well as parameters from other data sources like temperature sensors, pressure sensors etc. The system will also comprise housekeeping functions to control analyzer integrity, logging of data and diagnostic parameters as well as to communicate with and transfer measurement data to other systems. Calculation on data, control and housekeeping as well as communication with other systems will typically be performed by microprocessors and other electronics will in this patent text called a "processing unit" (2700).

A digital version of WMS, dWMS will not use analogue mixing, but will instead do processing in the digital domain.

The invention provides solution of spectroscopy related problems for in-situ, traditional extractive and open-path hydrogen detection. The hydrogen absorption line at 2121.8 nm is the strongest available but, nevertheless, it is very weak.

Moreover, it has severe interference with the neighbouring CO2 line when measured using traditional techniques. The H2 line at ambient pressure is actually rather narrow, much narrower than listed in HITRAN which uses default air/self-broadening parameters for this H2 line. Even if the correct parameters were listed, that would not help much since a spectroscopist or another person skilled in the art would normally state that this line is not suitable for measurement of H2 due to the much stronger CO2 line located almost at the same wavelength. Herein is described a method of how to avoid the CO2 interference and improve the detectability of H2. Herein is also described an apparatus that allows to measure this very weak H2 absorption and achieve the required LOD of at least 0.2% v*meter of H2 at ambient and elevated pressures.

To achieve the objective with the invention the laser modulation (1000, 1050) should in the WMS case be modified and the signal processing on the digitized signal from the light sensitive detector has to be modified.

The solution according to the current invention utilizes the unique property of the H2 absorption line: the unusually narrow linewidth at ambient pressure. The line remains narrow at somewhat elevated pressures. The absorption lines of CO2 and other gases absorbing nearby the H2 absorption line are all significantly broader and the widths of the lines increases further with increased pressure.

In both WMS and dWMS cases the laser modulation amplitude can be adjusted either to measure H2 or CO2, such as the signal from measured gas component is enhanced while the signal from the other component is suppressed.

In addition, a digital bandpass filter is applied to the digitized signal. The filter is designed to let only the essential portion of the frequency components of either H2 absorption line or CO2 (or other gas) to pass. In this way, the gas analyzer can measure H2 without CO2 interference. Alternatively, it can measure CO2 without influence of H2. The gas analyzer can thus alternate the modulation amplitude and the corresponding filter to measure both gas components.

There are two main achievements of this approach:
1) The signal to noise ratio, SNR, is greatly improved;
2) Interference from other gases absorbing nearby the H2 line, like CO2, is greatly reduced.

The SNR improves because stochastic noise with frequency components (in frequency domain) outside the filter frequency band is removed. Non-stochastic noise due to optical etalon effects with periods longer and shorter than the H2 linewidth is greatly reduced or even completely removed. The signal from the CO2 line after such filtering is suppressed to the levels below the required LOD for H2 detection. The H2 absorption signal is measured as the peak of the filtered signal at the position of the H2 line. The concentration is calculated by multiplying with the calibration constant and a correction function that takes into account the dependencies on pressure, temperature and the process gas composition (variation of the broadening).

Direct Absorption Spectroscopy (DAS) Example.

The wavelength of a laser is tuned around the absorption lines of H2 and CO2. The laser light is directed through the gas to be measured, the target gas (500), and is collected by the detector (2500). The detector signal (2510, 2520) is digitized (2600) using an AD converter with proper time and amplitude resolution to assure to fully resolve absorption profiles as weak as 5*10-6 of relative absorption. The detected signal is normalized to 100% transmission, and then inverted to get positive pure absorption signal, as demonstrated in FIG. 8. FIG. 8 shows modelled absorption signals for 10% v CO2 (5220) and 1% v H2 (5120).

To demonstrate the feasibility of the H2 measurements using DAS technique we aligned a narrow bandpass filter to the signals shown in FIG. 8. In this case it is 6th derivative $6^{th}$ order polynomial Savitzky-Golay (SG) filter. The width of the filter matches the width of the H2 line. As a result, the CO2 line is greatly suppressed compared to the H2 line. The interfering signal from the CO2 line (5230) is removed well below the required 0.2% v*m level (5135). Similar result can be achieved by applying few consecutive SG filters. For example, smoothing SG is applied following by $2^{nd}$ derivative SG and finally one 4th SG. The filters may not necessarily be SG but can be any specially designed custom filters suitable for the purpose.

FIG. 9 shows filtered signals (5130, 5230) after filtering using $6^{th}$ derivative SG filter.

Although the modelling demonstrates that measurements of H2 using DAS could be possible, the required LOD for H2 detection would most probably not be achieved in practice. This is because DAS suffers from laser intensity baseline and 1/f laser intensity noise.

Wavelength Modulation Spectroscopy (WMS) Example

The wavelength of a laser (2000) is tuned around the absorption lines of H2 and CO2. The wavelength is in addition modulated at a frequency significantly higher (1050) than the frequency of the tuning (1000). The laser light is directed through the gas to be measured (500) and is collected by the detector (2500). The detector signal is demodulated in an analogue electronics unit (2400) at harmonics of the modulation frequency: $2^{nd}$, $4^{th}$, harmonics etc. Typically, $2^{nd}$ harmonics is used (2f WMS). All unused harmonics can be filtered out using an appropriate bandpass filter before demodulation. In the digital version of WMS, dWMS, it will not be demodulated in the analogue electronics unit, but processed later using digital methods. The demodulated signal is then passed through a lowpass filter to remove all remaining high frequency components. The demodulated signal (2520) can in addition be normalized. The signal used for normalization could be the direct transmission signal, alternatively the demodulated $1^{st}$ harmonics, or alternatively a polynomial approximation of the 100% transmission baseline. We take as an example the $2^{d}$ harmonics detection, which is the most widespread WMS technique. The peak WMS signal depends on the ratio of the modulation amplitude to the absorption width. The largest peak signal is obtained when the modulation amplitude is about 2.2 of the absorption line HWHM (Reid et al). The positive peak amplitude of the 2f lineshape as a function of the ratio of the modulation amplitude to an absorption line HWHM is schematically shown in FIG. 10. Two cases are demonstrated: a plot for the H2 line (5140) and a corresponding plot for the CO2 line (5240). The 2f signal for H2 is maximized (5145) for the modulation amplitude around 2.2 of the H2 HWHM. The corresponding amplitude for the CO2 line shape at this modulation amplitude is about 5 times less than the top value. Thus, by proper choice of the modulation amplitude, the CO2 signal (5250) is suppressed several times while the H2 signal (5150) is optimized.

FIG. 10 shows peak signals for the H2 (5140) and CO2 (5240) 2f line shapes as functions of the modulation amplitude.

FIG. 11 shows the modelled 2f WMS absorption signals (5150, 5250) for the same absorption spectra of H2 (5120) and CO2 (5220) as in FIG. 8. The modulation amplitude is about 2.2 times H2 HWHM. As can be seen the CO2 peak signal (5250) is reduced. Interference at the H2 peak position from the CO2 signal is reduced significantly but not completely.

FIG. 11 shows modelled WMS 2f signals for 10% v CO2 (5250) and 1% v H2 (5150).

FIG. 12 shows the WMS signals after filtering (5160, 5260) with is $4^{th}$ derivative $4^{th}$ order polynomial SG filter.

The CO2 signal (5260) is reduced further down and the remaining interference at the H2 peak position is completely removed. The signals in FIG. 12 are obtained from the signals in FIG. 11 after filtering using a 4th derivative SG filter.

An analyzer according to the current invention uses a light source which is a tunable laser (2000). The beam (2100) from the tunable laser (2000) is pointed through a target gas (500) that potentially can contain hydrogen, H2, gas and the target gas (500) can also contain varying concentrations of other gases including CO2. After passing through the target gas (500), the laser beam (2100) or light signal reaches a detector (2500). The detector (2500) converts the light signal into an analogue electrical signal (2510) and this analogue electrical signal (2510) will be processed by an analogue electronics unit (2400) outputting a conditioned analogue signal (2520). The conditioned analogue signal (2520) will be sampled and digitized by a digitization unit (2600). The digitized signal from the digitization unit (2600) will be forwarded to and processed by a processing unit (2700) and a result will be calculated representing the measured concentration of H2 in the target gas (500). The analyzer will have input power cables or connections (2710). The analyzer will have an input and output interface (2720) comprising required input and output signals. Input signals could be analogue and digital interfaces for inputting process temperature and pressure as well as other parameters needed by the analyzer. Output signals could be analogue and digital interfaces for outputting concentrations, optical transmission as well as other analyzer parameters and status information. The input/output interface could also support production, service, calibration and diagnostic procedures. Interface types could be current loop (0-20, 4-20 mA), RS232/422/485, Modbus RTU/TCP, Ethernet, Ethernet IP, ProfiBus, ProfiNet as well as all other known or new standard or proprietary protocols.

The optical system (2200, 2250, 2220) of the analyzer will form the laser beam (2100) using beam shaping optics (2200), then using a tilted and wedged window (2250) to isolate the analyzer transmitter part (600) from the process containing the target gas (500). The laser beam (2100) will pass through the target gas (500), enter a tilted and wedged window on the receiver (650) and then the laser beam (2100) will be focused by a focusing lens (2220, 2270) onto the detector 2500. A small sealed gas cell (550) for verification purposes can be part of the optical system and will be inserted in the optical path preferably right in front of the detector 2500. An optional optical design could comprise only mirrors or a combination of mirrors and lenses.

The problem to solve is to be able to measure H2 using the selected H2 absorption line in the presence of the close nearby CO2 absorption line and at the same time measure in-situ in industrial processes at 1 atm pressure or above. The problem is solved by utilising combination of different techniques to enhance the H2 absorption line and at the same time suppress the CO2 absorption line.

In the current application the term «enhance», in the context of discriminate between the H2 absorption line and nearby absorption lines of other gases like CO2, means that the H2 absorption signal is enhanced relatively to the absorption lines of other gases like CO2. However, it might be that the H2 absorption line has only been maintained on approximately the same level while the absorption lines of the other gases have been suppressed.

In the WMS and/or dWMS case the modulation amplitude will also be adjusted so that the amplitude is matched to around 2.2 times the HWHM of the H2 line to be measured in the analyzer according to the current invention. A diagram for this is shown in FIG. 10 were peak signals for the H2 (5140) and CO2 (5240) as a function of the modulation amplitude are plotted. The maximum point (5145) on the H2 curve (5140) corresponds to 2.2 on the X-axis. This corresponds to findings in academic publication Reid et al. Since the H2 line is very narrow, the modulation will be reduced to around a fifth of what would have been modulation levels for other gases normally present in the atmosphere.

The harmonic signal in the WMS embodiments of the analyzer according to the current invention will then be filtered with one or more digital filters in filter steps to further enhance the H2 line and to suppress the lines of interfering gases like CO2. The digital filters also help suppress noise that could be present in the digitized signal.

Any higher order bandpass digital filter or filter step adapted to enhance the H2 line in the harmonic signal and adapted to suppress interfering gases like CO2 can be used.

A preferred embodiment for the WMS case digital filter step is to use a 4th derivative 4th order Savitzky-Golay filter.

FIG. 16 discloses the sensitivity and selectivity of the H2 gas analyzer in a WMS embodiment. The optical design according to the current invention allowed achieving LOD of better than 0.2% v of H2 over 1 meter pathlength. The filtering using a $4^{th}$ derivative filter allowed reducing interference from the CO2 absorption to well below 0.2% v*meter of H2.

Embodiment of an Extractive Solution

Hydrogen gas sensors/analyzers known from the prior art typically are point sensors measuring H2 in a point or are extractive analyzers sampling the target gas from a point in a process or in a point in the air or atmosphere where one wants to measure H2. Using extractive analyzers the target gas is lead from the sample point to a cell which is critical for the feasibility of the measurement of prior art systems. System described in U.S. Pat. No. 7,298,490 B2 to Los Gatos Research, Baer at al, uses a cavity enhanced technique to achieve a very long optical path in a cell in order to increase absorption sensitivity of the used H2 absorption line. The "ProCeas H2 Trace Analyzer" from company ap2e also uses a cavity enhanced technique to achieve a very long optical path in a cell to increase absorption of a target gas. Normally, the ProCeas analyzers operate the cell at low pressure using a vacuum pump. A significantly reduced pressure makes absorption lines of CO2 and other potentially interfering gases narrower thus making it easier to measure H2 without interference from nearby lines.

An H2 analyzer according to the current invention does not need a cavity enhanced technique to achieve sensitivity to H2 absorption. It does not need an extractive cell. However, in some cases a simple, not a cavity enhanced, extractive cell solution can still be practical to use and an analyzer according to the current invention is also very well suited for use with extractive cells. An extractive cell can be operated not only at atmospheric pressure, but also at elevated pressures up to around 5 atm. In some cases, operating the cell at elevated pressures is advantageous. This is because the linewidths of the CO2 line and/or absorption lines of other gases are increasing with pressure while the width of the H2 line is either relatively independent on pressure or increases with pressure but with a much lower rate (this depends on the gas mixture).

FIGS. 14 and 15 show plots of lab measurements of H2 and CO2 with pressures 1.0 and 1.5 atm. A gas analyzer according to the current invention makes it possible to operate an extractive at atmospheric pressure and even at a somewhat elevated pressure up to above 3 atm. Since the linewidth of CO2 or other interfering gases increases with increasing pressure operating the cell at elevated pressure makes an analyzer according to the current invention less sensitive to these interfering gases. In this sense, an analyzer according to the current invention behaves in the opposite direction with regards to gas pressure where analyzers according to prior art requires a gas pressure significantly below atmospheric pressure to operate properly.

Dual Gas H2 and CO2 Analyzer

One of the main problems solved with the current invention is to enhance the relatively narrow H2 absorption line and at the same time suppress as much as possible the nearby wider absorption line of CO2. A dual gas embodiment according to the current invention will then measure both H2 and CO2 using a time multiplexing technique. What is further referred as CO2 gas could be another gas absorbing at the same wavelength close to the H2 line. Part of the time the analyzer will function as an H2 analyzer as described in other embodiments of the current invention. It will function as a more traditional CO2 analyzer the other part of the time. In the different modes, H2 and CO2 measurement, different digital filter operational steps will be used. The modulation amplitude will be switched between the high amplitude when measuring CO2 as shown in FIG. 18, and low modulation amplitude when measuring H2 as shown in FIG. 17. In addition, the tunable laser tuning can be switched between somewhat wider wavelength range when measuring CO2 and a narrow wavelength range when measuring H2. When measuring H2, digital filter operational steps will be performed, and these filter steps will be adjusted so as to suppress the CO2 absorption signal and to enhance the H2 absorption signal. When measuring CO2, other digital filter operational steps will be performed, and these filter steps will be adjusted so as to suppress the H2 absorption line and to enhance the CO2 absorption line. This way it is possible to implement a time multiplexed H2 and CO2 gas analyzer. In case of an extractive cell embodiment, the cell pressure can be adjusted depending on the measured gas component. When H2 is measured, the cell pressure is raised to above atmospheric pressure such as the CO2 absorption signal is suppressed even more since the CO2 absorption line is wider at higher pressure. When CO2 is measured, the cell pressure is reduced to atmospheric pressure such as the CO2 line becomes less broadened and the CO2 WMS signal becomes stronger.

Verification of Wavelength Range and Analyzer Operation

The analyzer provides laser wavelength verification and internal health control by using a small reference gas cell. Traditional approach utilizes a reference beam in the transmitter/transceiver unit by splitting the laser beam and directing the reference beam onto a reference detector via a reference sealed cell filled with target gas. An embodiment of an analyzer according to the current invention could comprise a reference cell (550) containing a gas that could be used to verify the wavelength range the laser (2000) is scanned with the ramp (1000). This purpose will typically be referred to as "line-locking" or "line-tracking". Such a cell (550) could also be used for verification of the concentration calibration, a so-called "span check". The cell (550) could either be placed in the optical path permanently or be inserted in the path when the analyzer performs verification checks.

To achieve a short cell (550), another gas than H2 must be selected, since the H2 absorption signal is too weak. Such gas must have at least one sufficiently strong absorption line close to the wavelength of the H2 absorption line being used in the analyzer according to the current invention. Both the H2 line and at least one sufficiently strong absorption line of the other selected gas must be within the tuning range of the laser (2000).

One example of a gas in the cell (550) that is suitable for the verification purpose is nitrous oxide, N2O. With a pressure in the cell (550) from 0.2 to 0.4 atm the linewidth of the N2O absorption line will be similar to the linewidth of the H2 line such as the signal from N2O absorption will pass the digital filter steps without significant suppression.

One feature of an H2 analyzer according to the current invention could be an extended functionality test. In addition to the "line-locking" using the sealed reference cell, the laser wavelength tuning range can be tested against the reference tuning range. Deviations in the laser tuning range could make the acquired absorption signal either stretched or compressed so that the absorption lines will appear either wider or narrower.

Another feature of an H2 analyzer according to the current invention could be internal span check of H2, when the reference cell is also functioning as a span cell. When the span check function is initiated, the analyzer instead of measuring H2 absorption peak switches to measuring the absorption peak that belongs to the reference cell. The absorption peak from the cell may be from another gas that is used for wavelength verification, e.g. N2O. During the span check, the signal is measured not at the H2 peak position but at the position of the reference absorption line. Further, the signal is processed and the concentration calculated as if it was the H2 signal. Thus, for the span of H2, a substitute gas from the reference cell is used. The cell may stay permanently in the laser beam or can be flipped in and out during the span check.

The invention claimed is:

1. Gas analyzer based on tuneable laser spectroscopy for measurement of concentration of Hydrogen gas, H2, in a target gas (500) comprising a gas matrix possibly comprising interfering gases, the analyzer comprising a transmitter part (600) and a receiver part (650), the transmitter part (600) comprising a tunable laser (2000) arranged for emitting laser light in the form of a laser beam (2100), the laser beam (2100) following an optical path, a processing unit (2700) performing housekeeping including means for laser tuning and laser modulation, wavelength of the laser light being tuned across an absorption line of the at least one gas component to be measured, the laser beam (2100) passing through the target gas (500) and onto a light sensitive detector (2500) comprised by the receiver part (650), the light sensitive detector generating an absorption signal (2510) possibly comprising an absorption signal contribution from the gas component to be measured and from the interfering gases, a digitization unit (2600) digitizing the absorption signal (2510), the digitized absorption signal from the digitization unit (2600) being inputted to the processing unit (2700), the processing unit (2700) performing calculation of the measured concentration of gas component to be measured in the target gas (500) based on the digitized absorption signal, the analyzer characterised by the wavelength of the laser light being tuned across an H2 absorption line near 2122 nm, the gas analyzer further comprising a sealed reference gas cell (550) comprising an other gas than H2 with at least one absorption line spectrally adjacent to the absorption line of H2, so that the laser light is tuned across the H2 line and across the line of said gas in the reference gas cell, the analyzer being suitable for wavelength modulation spectroscopy, WMS, or digital wavelength modulation spectroscopy, dWMS, the processing unit (2700) applying to the laser a higher frequency modulation of the wavelength, wherein amplitude of the said wavelength modulation is set to approximately match the H2 absorption line width so as to retain the H2 WMS absorption signal and to suppress WMS absorption signals from said possible interfering gases having broader absorption lines than the H2 line, the processing unit (2700) applying a digital filter of a higher order digital filter type to the digitized WMS signal wherein the filter is adapted to pass through the H2 WMS signal and to suppress the WMS signal from the possible interfering gases, the processing unit (2700) calculating the concentration of hydrogen gas component based on the filtered signal, and verifying the signal from the other said gas contained in the reference cell so as to control the laser tuning over a wavelength interval comprising the absorption line of H2.

2. Gas analyzer according to claim 1, wherein the reference gas cell (550) is permanently arranged in the optical path.

3. Gas analyzer according to claim 2, wherein the processing unit, based on information from the reference gas cell, controlling the laser tuning such that to position the centre of the H2 absorption line in the absorption signal at the same position relatively to the laser tuning range.

4. Gas analyzer according to claim 3, wherein the processing unit, based on information from the reference gas cell, adjusting the laser tuning range such that the positions of the absorption lines are kept approximately in the same positions relatively to the sampled region and such that the laser tuning is kept linear or in an arbitrary predefined way of tuning.

5. Gas analyzer according to claim 1, wherein the reference gas cell (550) is arranged for being flipped in and out of the optical path depending on required function such that the cell is flipped out for measuring the gas concentrations and the cell is flipped in for verifying the signal.

6. Gas analyzer according to claim 5, wherein the processing unit, based on information from the reference gas cell, controlling the laser tuning such that to position the centre of the H2 absorption line in the absorption signal at the same position relatively to the laser tuning range.

7. Gas analyzer according to claim 6, wherein the processing unit, based on information from the reference gas cell, adjusting the laser tuning range such that the positions of the absorption lines are kept approximately in the same positions relatively to the sampled region and such that the laser tuning is kept linear or in an arbitrary predefined way of tuning.

8. Gas analyzer according to claim 1, wherein the processing unit (2700), based on information from the reference gas cell (550), controlling the laser tuning such that to position the centre of the H2 absorption line in the absorption signal at the same position relatively to the laser tuning range.

9. Gas analyzer according to claim 8, wherein the processing unit (2700), based on information from the reference gas cell (550), adjusting the laser tuning range such that the positions of the absorption lines are kept approximately in the same positions relatively to the sampled region and such that the laser tuning is kept linear or in an arbitrary predefined way of tuning.

10. Gas analyzer according to claim 1, wherein the reference cell (550) comprising the other gas, the other gas being N2O.

11. Gas analyzer according to claim 1, wherein the wavelength modulation amplitude is set to approximately 2.2 times the half width half max, HWHM, of the H2 absorption line in the target gas.

* * * * *